United States Patent
Anderson et al.

(10) Patent No.: US 12,397,449 B2
(45) Date of Patent: Aug. 26, 2025

(54) VACUUM-BASED GRIPPING TOOL

(71) Applicant: Cryovac, LLC, Charlotte, NC (US)

(72) Inventors: Roger Jeffrey Anderson, Mooresville, NC (US); Bradley Keith Powell, York, SC (US); Siddarth Sreeram, Charlotte, NC (US); Bradley Neal Daley, Huntersville, NC (US)

(73) Assignee: Cryovac, LLC, Charlotte, NC (US)

( * ) Notice: Subject to any disclaimer, the term of this patent is extended or adjusted under 35 U.S.C. 154(b) by 143 days.

(21) Appl. No.: 17/793,481

(22) PCT Filed: Feb. 9, 2021

(86) PCT No.: PCT/US2021/017158
§ 371 (c)(1),
(2) Date: Jul. 18, 2022

(87) PCT Pub. No.: WO2021/163003
PCT Pub. Date: Aug. 19, 2021

(65) Prior Publication Data
US 2023/0083575 A1    Mar. 16, 2023

Related U.S. Application Data

(60) Provisional application No. 63/046,850, filed on Jul. 1, 2020, provisional application No. 62/972,229, filed on Feb. 10, 2020.

(51) Int. Cl.
*B25J 15/06*    (2006.01)
*B25J 15/00*    (2006.01)

(52) U.S. Cl.
CPC ....... *B25J 15/0633* (2013.01); *B25J 15/0052* (2013.01)

(58) Field of Classification Search
None
See application file for complete search history.

(56) References Cited

U.S. PATENT DOCUMENTS 4,674,785 A    6/1987    Riesenberg
6,431,623 B1    8/2002    Roeters et al.
(Continued)

FOREIGN PATENT DOCUMENTS

DE    102011056029 A1    6/2013
EP    3133035 A1    2/2017
(Continued)

OTHER PUBLICATIONS

Piab piGRIP®, "Pick whatever you want!" Brochure, dated Oct. 22, 2018, (downloaded from https://neffautomation.com/wp-content/uploads/Piab-piGrip-Brochure.pdf).

*Primary Examiner* — Michael S Lowe
(74) *Attorney, Agent, or Firm* — Jon M. Isaacson

(57) ABSTRACT

A gripping tool includes a vacuum manifold, a flexible membrane, and vacuum channels coupled in parallel between the vacuum manifold and the flexible membrane. Each of the vacuum channels includes a compliant conduit, a vacuum check valve, and suction cup. The vacuum check valve is biased to a closed condition and is configured to toggle from the closed condition to an open condition when a vacuum source applies a vacuum in the vacuum manifold and the suction cup of that vacuum channel is engaged by the object. Each of the check valves independently toggles between the closed condition and the open condition such that, when a vacuum is drawn in the vacuum manifold, the vacuum is maintained in the vacuum manifold and in the compliant conduits of the vacuum channels that have engaged suction cups.

27 Claims, 18 Drawing Sheets

(56) References Cited

U.S. PATENT DOCUMENTS

| | | | |
|---|---|---|---|
| 7,390,040 B2 * | 6/2008 | Subotincic | B25J 15/0616 414/737 |
| 2014/0199153 A1 | 7/2014 | Reinhold et al. | |
| 2017/0073174 A1 | 3/2017 | Tanaka et al. | |

FOREIGN PATENT DOCUMENTS

| JP | H11278658 A | 10/1999 |
|---|---|---|
| JP | 2012086950 A | 5/2012 |

* cited by examiner

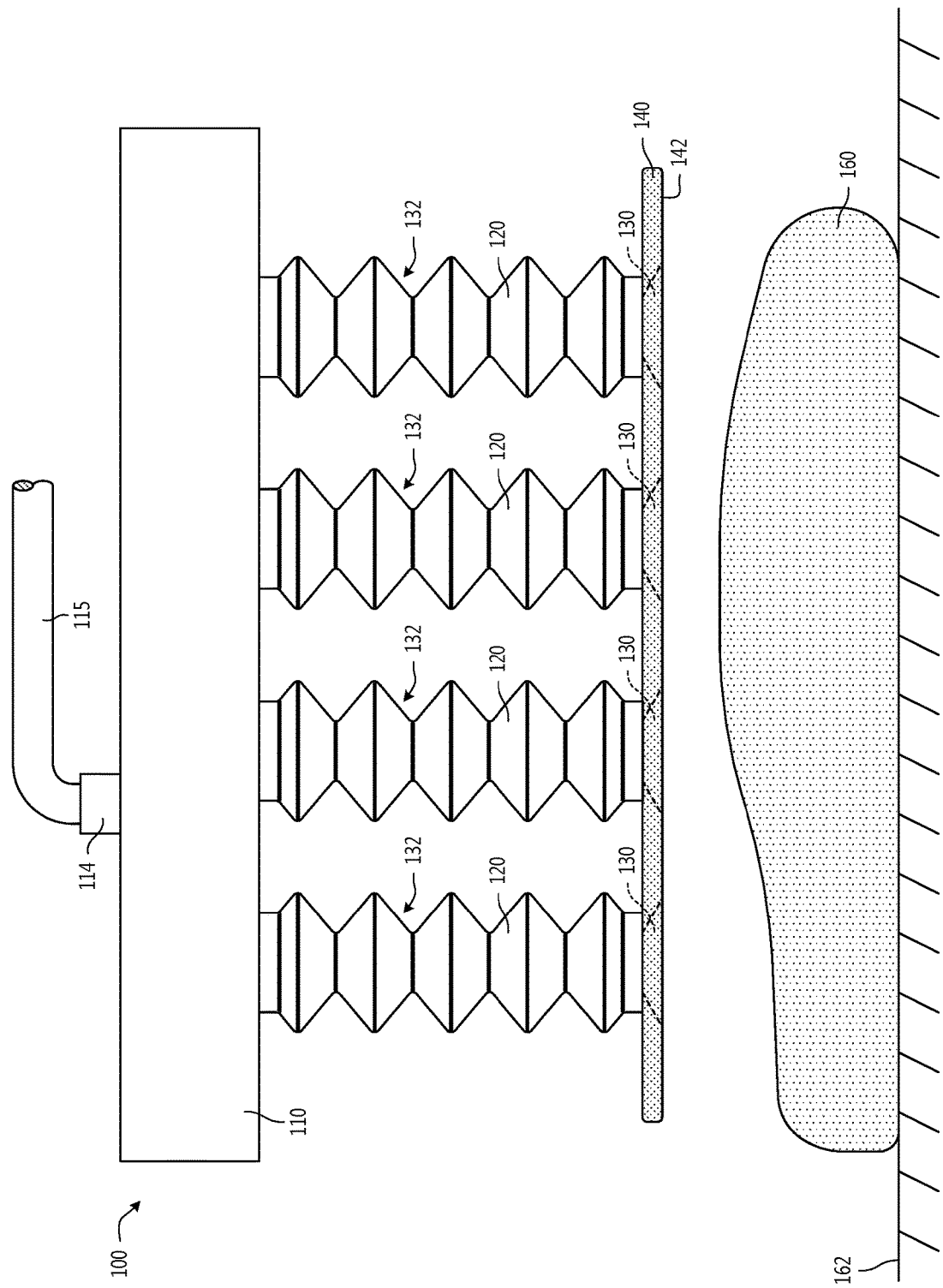

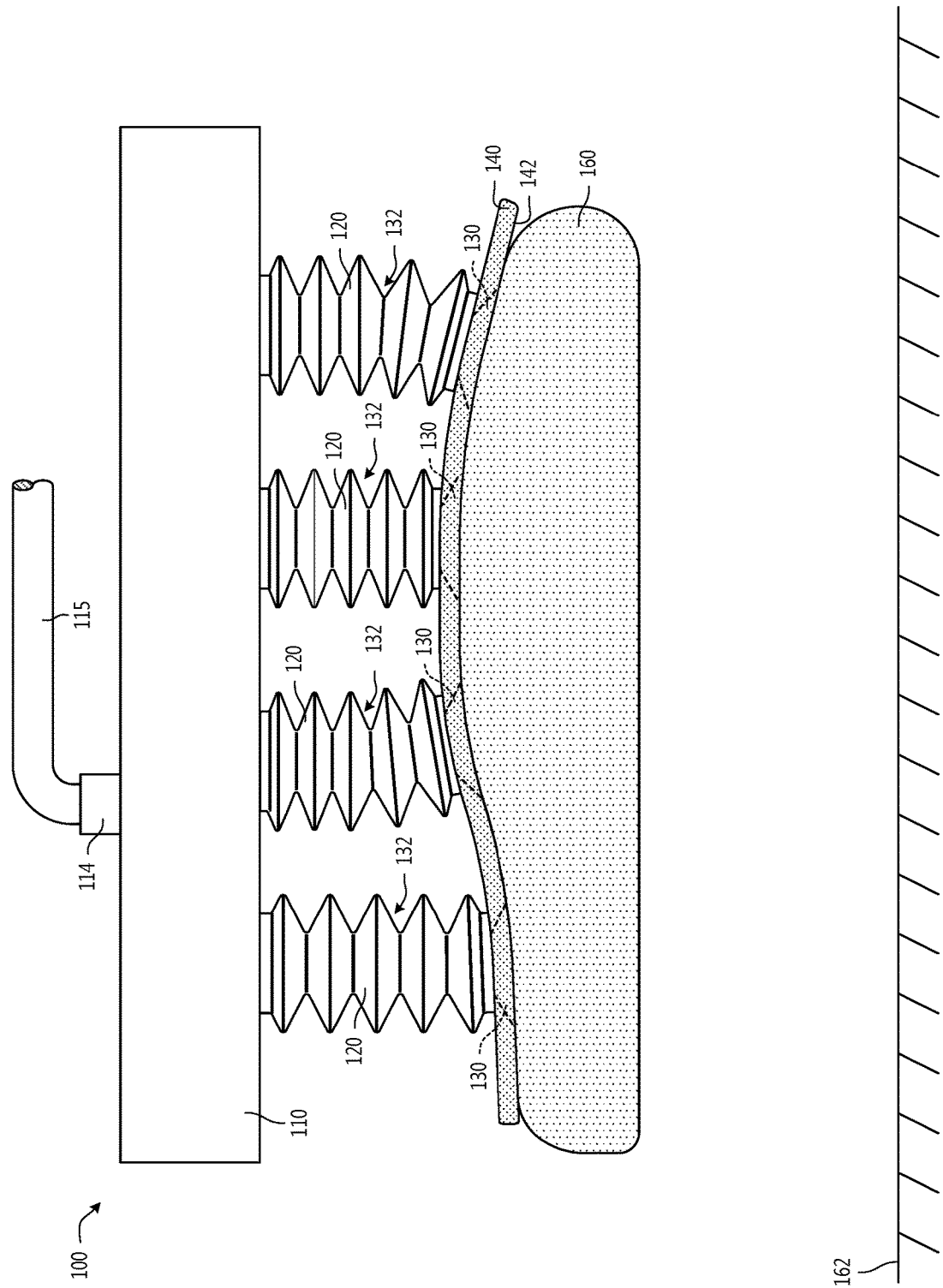

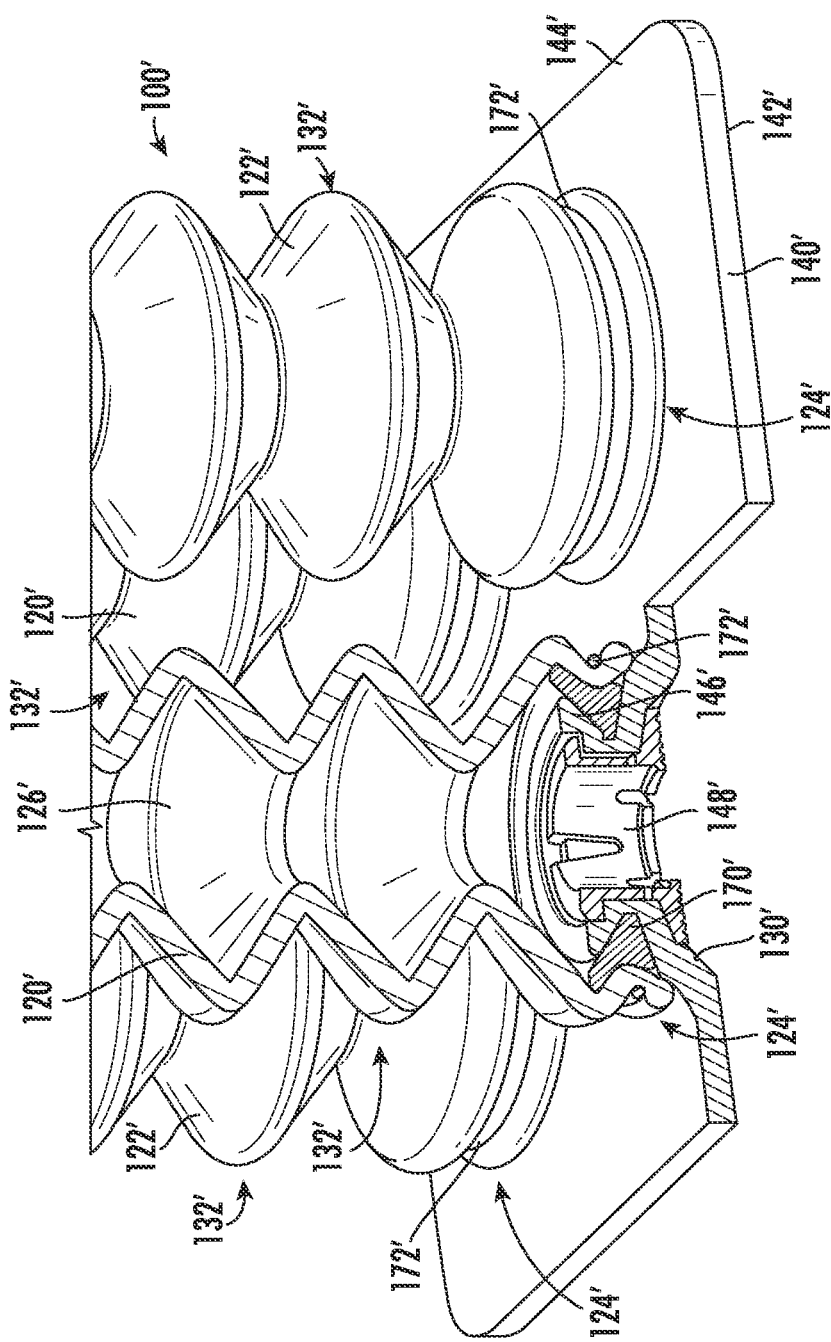

VACUUM-BASED GRIPPING TOOL

BACKGROUND

The present disclosure is in the technical field of vacuum-based gripping tools. More particularly, the present disclosure is directed to gripping tools that include suctions cups that are coupled in parallel to a vacuum manifold, where a vacuum is applied to only the suction cups that are engaged to an object.

End-of-arm tools are used on robotic arms for many functions, including gripping and moving objects. For example, pincher end-of-arm tools can be used to grasp objects by pinching sides of the objects. While pincher end-of-arm tools are effective tools for gripping and moving objects, pincher end-of-arm tools have a number of drawbacks. In some cases, the intended destination of an object may be in a location where a pincher end-of-arm tool cannot operate properly. For example, if the intended destination of an object is inside of an open cardboard box, the intended location of the object may not have sufficient space between the object and the sides of the cardboard box to permit the pincher end-of-arm tool to be located along the side of the object. Even if there is sufficient space between the object and the sides of the cardboard box for the pincher end-of-arm tool to be located along the side of the object, the intended location of the object may not have sufficient space between the object and the sides of the cardboard box to permit the pincher end-of-arm tool to open after the object is in the intended location. If the pincher end-of-arm tool were to open in those circumstances, the pincher end-of-arm tool may damage or deform the cardboard box. It would be advantageous for a gripping tool to permit placement of objects in locations where former end-of-arm gripping tools are not able to place objects.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, gripping tool includes a vacuum manifold configured to be coupled to a vacuum source, a flexible membrane that is conformable to a non-planar surface of an object, and a plurality of vacuum channels coupled in parallel between the vacuum manifold and the flexible membrane. Each of the plurality of vacuum channels includes a compliant conduit having a proximal end coupled to the vacuum manifold and a distal end coupled to the flexible membrane, a vacuum check valve coupled to the proximal end of the compliant conduit, and a suction cup coupled to the distal end of the compliant conduit. The vacuum check valve is biased to a closed condition and is configured to toggle from the closed condition to an open condition when the vacuum source applies a vacuum in the vacuum manifold and the suction cup is engaged by the object. Each of the check valves in the plurality of vacuum channels is configured to independently toggle between the closed condition and the open condition such that, when the vacuum source applies the vacuum in the vacuum manifold, the vacuum is maintained in the vacuum manifold and the compliant conduits of the plurality of vacuum channels that have engaged suction cups regardless of a number of the plurality of vacuum channels that have unengaged suction cups.

In a second embodiment, each of the compliant conduits of the plurality of vacuum channels of the first embodiment includes a bellows-shaped composite material.

In a third embodiment, the bellows-shaped composite material of each of the plurality of vacuum channels of the second embodiment includes a first portion proximate the distal end of the compliant conduit and a second portion. A rigidity of the first portion of the bellows-shaped composite material is greater than a rigidity of the second portion of the bellows-shaped composite material.

In a fourth embodiment, the suction cup of each of the plurality of vacuum channels of the third embodiment is coupled to the first portion of the bellows-shaped composite material.

In a fifth embodiment, the first portion of any of the third to fourth embodiments has a Shore durometer in a range between about 48 A and about 52 A and the second portion has a Shore durometer in a range between about 59 D and about 63 D.

In a sixth embodiment, when the proximal ends of the compliant conduits of any of the preceding embodiments are fixedly coupled to the vacuum manifold, each of the distal ends of the compliant conduits is capable of moving in three dimensions with respect to the vacuum manifold.

In a seventh embodiment, the distal end of at least one of the compliant conduits of the sixth embodiment is capable of rotating at least 45 degrees with respect to the vacuum manifold.

In an eighth embodiment, the suction cups of the plurality of vacuum channels of any of the preceding embodiments are integrated with the flexible membrane.

In a ninth embodiment, each of the suction cups of the eighth embodiment includes a cup on an object contact surface of the flexible membrane and a conduit interface on a conduit contact surface of the flexible membrane.

In a tenth embodiment, the gripping tool of the ninth embodiment further includes a deformable material located on the object contact surface of the flexible membrane around at least some of the suction cups.

In an eleventh embodiment, the deformable material of the tenth embodiment includes a plurality of foam rings coupled to the object contact surface around the at least some of the suction cups.

In a twelfth embodiment, the deformable material of any of the tenth to eleventh embodiments includes a sheet of foam material coupled to the object contact surface, the sheet of foam material having holes therein that are aligned with the at least some of the suction cups.

In a thirteenth embodiment, the flexible membrane of any of the preceding embodiments is located between the distal ends of the compliant conduits and the suction cups such that the suction cups extend away from an object contact surface of the flexible membrane.

In a fourteenth embodiment, the suctions cups of the thirteenth embodiment are indirectly coupled to each other via the flexible membrane.

In a fifteenth embodiment, the compliant conduit and the suction cup of each of the plurality of vacuum channels of any of the preceding embodiments are integrally formed together.

In a sixteenth embodiment, the flexible membrane of the fifteenth embodiment is coupled to the integrally-formed compliant conduit and suction cup of each of the plurality of vacuum channels.

In a seventeenth embodiment, the flexible membrane, the compliant conduits of the plurality of vacuum channels, and the suction cups of the plurality of vacuum channels of the any of the preceding embodiments are integrally formed as a single component.

In an eighteenth embodiment, an object contact surface of the flexible membrane of the seventeenth embodiment is either set back from or coplanar with distal ends of the suction cups of the plurality of vacuum channels.

In a nineteenth embodiment, the compliant conduit of any of the preceding embodiments is made from a substantially-uniform material.

In a twentieth embodiment, the gripping tool of claim of the nineteenth embodiment further comprises an intermediate retainer located between the distal end of the compliant conduit and a conduit interface on a conduit contact surface of the flexible membrane.

In a twenty first embodiment, the intermediate retainer of the twentieth embodiment has a rigidity greater than a rigidity of one or both of the distal end of the compliant conduit or the conduit interface.

In a twenty second embodiment, the gripping tool of any of the twentieth or twenty first embodiments further includes an internal retainer positioned within an interior of the conduit interface and an external retainer positioned on an exterior of the distal end of the compliant conduit. The internal retainer and the intermediate retainer exert a compressive force on the conduit interface. The intermediate retainer and the external retainer exert a compressive force on the distal end of the compliant conduit.

In a twenty third embodiment, a method of moving an object incudes coupling the gripping tool of any of the first to eighteenth embodiments to an end of a robotic arm and moving the robotic arm until the gripping tool is in contact with an object located at a first location such that the gripping tool is in contact with the object and at least one of the suction cups of the gripping tool are engaged by a surface of the object. With the at least one of the suction cups engaged by the surface of the object, the method further includes causing the vacuum source to apply the vacuum in the vacuum manifold. The vacuum in the vacuum manifold and the compliant conduits associated with the at least one of the suction cups applies a force on the object that is greater than the weight of the object such that the object is gripped by the gripping tool. While the vacuum source applies the vacuum in the vacuum manifold so that the object is gripped by the gripping tool, the method further includes moving the robotic arm so that the object moves from the first location to a second location.

In a twenty fourth embodiment, the method of the twenty third embodiment further includes, after the object is at the second location, causing the vacuum source to stop applying the vacuum in the vacuum manifold so that the object is no longer gripped by the gripping tool, and moving the robotic arm so that the gripping tool is no longer in contact with the object.

In a twenty fifth embodiment, the second location of any of the twenty third to twenty fourth embodiments is inside of a shipping container.

In a twenty sixth embodiment, moving the robotic arm so that the object moves from the first location to the second location of the twenty fifth embodiment includes changing an orientation of the object as the object moves from the first location of the second location so that the object has a predetermined orientation inside of the shipping container.

In a twenty seventh embodiment, the surface of the object of any of the twenty third to twenty sixth embodiments is a non-planar surface.

In a twenty eighth embodiment, the object of the object of any of the twenty third to twenty seventh embodiments is a vacuum-packaged product.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIGS. 6A to 6D depict a series of instances of an embodiment of a method of using the gripping tool shown in FIGS. 1 and 2 to grip and object and lift the object from a surface, in accordance with the embodiments disclosed herein;

FIGS. 11A and 11B depict perspective views of a partial cross-sectional view and an exploded view of another embodiment of a gripping tool that includes a compliant conduit made from a substantially-uniform material, in accordance with the embodiments disclosed herein;

DETAILED DESCRIPTION

The present disclosure describes embodiments of gripping tools that can be used to grip objects. In some embodiments, a gripping tool includes a vacuum manifold, a flexible membrane, and a plurality of vacuum channels. The vacuum manifold is configured to be coupled to a vacuum source. The flexible membrane is conformable to a nonplanar surface of an object. In some embodiments, each of the plurality of vacuum channels includes a compliant conduit coupled between the vacuum manifold and the flexible membrane, a vacuum check valve, and a suction cup coupled to a distal end of the compliant conduit. The vacuum check valves are biased to a closed condition and are configured to toggle from the closed condition to an open condition when a vacuum source applies a vacuum in the vacuum manifold and the corresponding suction cup is engaged by an object. Each of the check valves is configured to independently toggle between the closed condition and the open condition such that, when the vacuum source applies the vacuum in the vacuum manifold, the vacuum is maintained in the vacuum manifold and the compliant conduits of the plurality of vacuum channels that have engaged suction cups regardless of a number of the plurality of vacuum channels that have unengaged suction cups.

Figure 1:
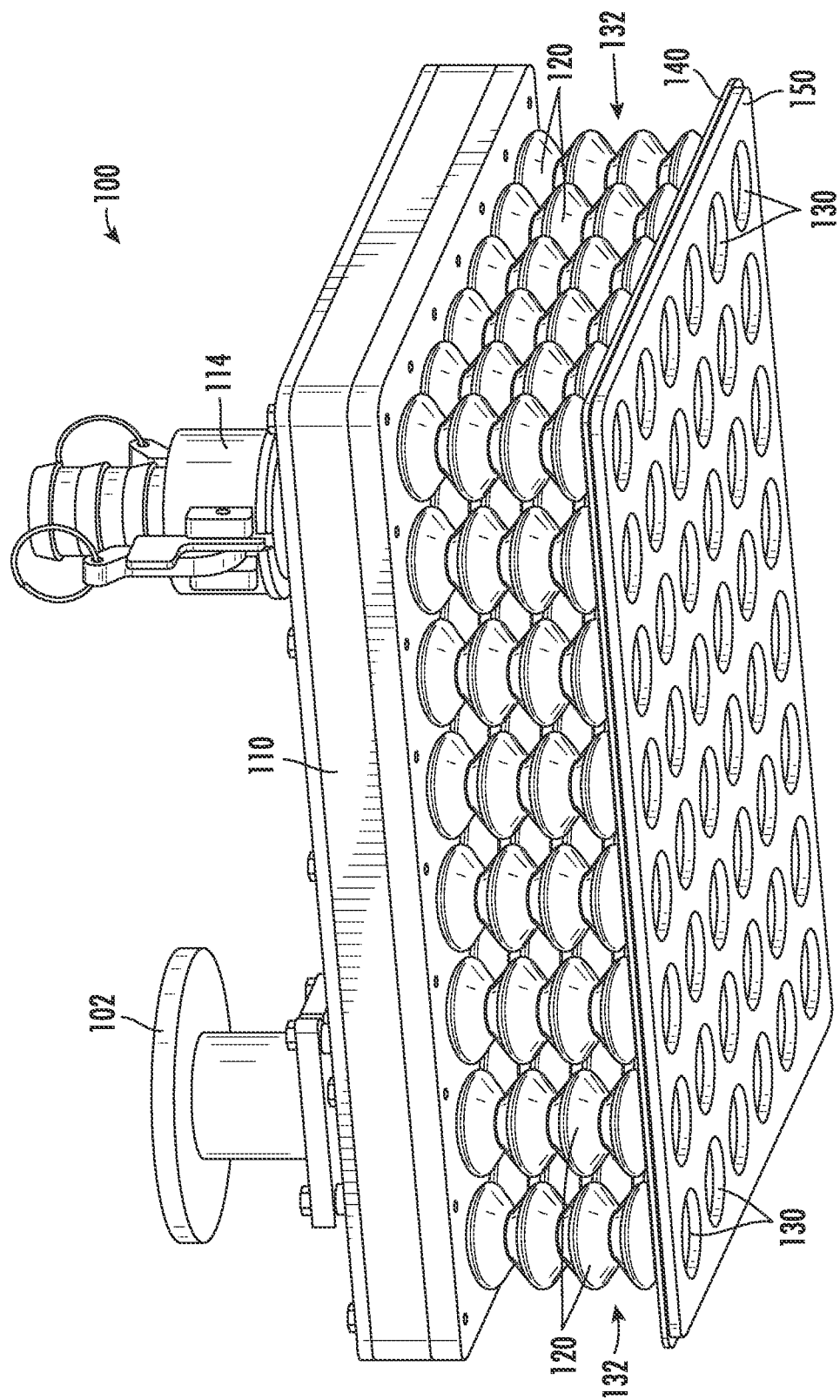
FIGS. 1 and 2 depict a perspective view and a partial cross-sectional view, respectively, of an embodiment of a gripping tool, in accordance with the embodiments disclosed herein.
Figure 2:
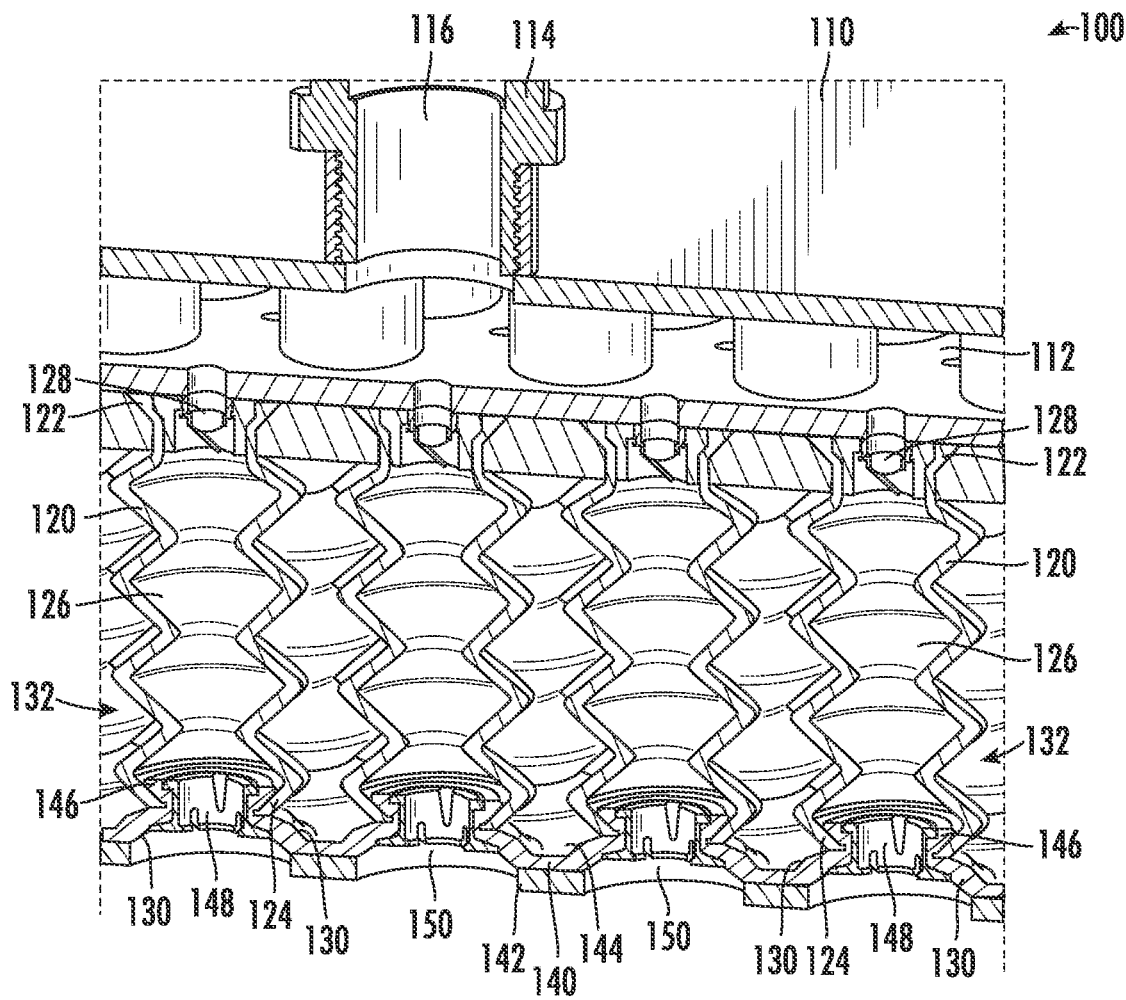

FIGS. 1 and 2 depict a perspective view and a partial cross-sectional view, respectively, of an embodiment of a gripping tool 100. In some embodiment, the gripping tool 100 is configured for vacuum-based gripping of objects. In some embodiments, the gripping tool 100 is configured to be used as an end-of-arm-tool for a robotic arm or as a tool on any portion of any movement device. In the depicted embodiment, the gripping tool 100 includes a coupling mechanism 102 that is configured to be coupled to a movement device, such as a conveyor, a robotic arm, or any other device capable of movement.

The gripping tool 100 includes a vacuum manifold 110. The vacuum manifold 110 has an interior space 112 in which a vacuum can be induced. As used herein, "a vacuum" refers to a pressure state in a space that is below the ambient pressure outside of the space. For example, when a vacuum is drawn in the interior space 112 of the vacuum manifold 110, the pressure in the interior space of the vacuum manifold is below the ambient pressure outside of the vacuum manifold 110. The vacuum manifold 110 also includes a vacuum port 114 that is fluidly coupled to the interior space 112 of the vacuum manifold 110. In the depicted embodiment, the vacuum port 114 has a bore 116 that is in fluid communication with the interior space 112 of the vacuum manifold 110.

The gripping tool 100 also includes compliant conduits 120 that are coupled to the vacuum manifold 110. The compliant conduits 120 include proximal ends 122 and distal ends 124. In the depicted embodiment, the proximal ends 122 of the compliant conduits 120 are coupled to a lower end of the vacuum manifold 110. The compliant conduits 120 also include interior spaces 126. Each of the interior spaces 126 is arranged to fluidly couple the proximal and distal ends 122 and 124 of one of the compliant conduits 120. In some embodiments, the compliant conduits 120 are made from a compliant material, such as a rubber material like a urethane rubber, a platinum-cured silicone rubber, and the like. In some embodiments, the material of the compliant conduits 120 are selected such that the compliant conduits 120 are capable of movement and/or changes of shape without plastic deformation to the compliant conduits 120. In some embodiments, when the proximal ends 122 of the compliant conduits 120 are fixedly coupled to the vacuum manifold 110, each of the distal ends 124 of the compliant conduits 120 is capable of moving in three dimensions with respect to the vacuum manifold 110.

Figure 3A:
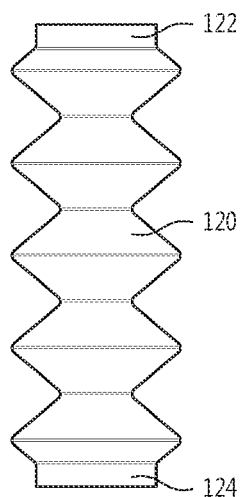
FIG. 3A depicts a compliant conduit from the gripping tool shown in FIGS. 1 and 2 in a resting state, in accordance with the embodiments disclosed herein.
Figure 3B:
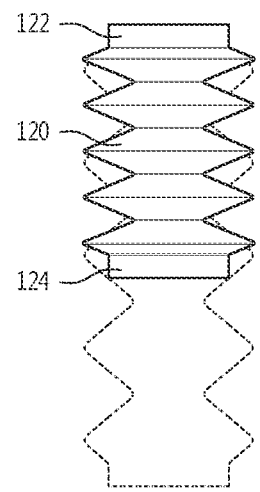
FIGS. 3B to 3D depict examples of the compliant conduit from FIG. 3A where the distal end of the compliant conduit has been moved from the resting state with respect to the proximal end, in accordance with the embodiments disclosed herein.
Figure 3C:
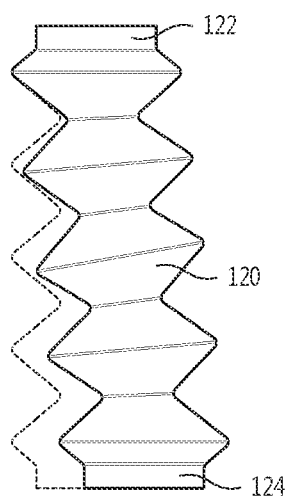
Figure 3D:
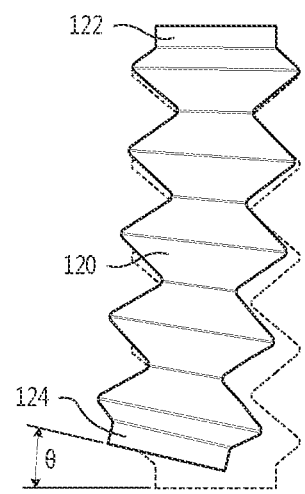

In some embodiments, the proximal and distal ends 122 and 124 of the compliant conduits 120 are capable of respective movement because of the compliant nature of the compliant conduits 120. FIG. 3A depicts one of the compliant conduits 120 in a resting state. The resting state of the compliant conduit 120 may be the position and shape of the compliant conduit 120 when the compliant conduit 120 is not being moved and/or the only forces acting on the compliant conduit 120 are natural or ambient forces (e.g., gravity, air pressure from the ambient environment, etc.). FIGS. 3B to 3D depict examples of the compliant conduit 120 where the distal end 124 has been moved from the resting state with respect to the proximal end 122. FIGS. 3B to 3D also show, in dashed lines, an outline of the resting state of the compliant conduit 120. In some embodiment, each of the compliant conduits 120 in the gripping tool 100 is capable of moving in one or more of the ways depicted in FIGS. 3B to 3D. In the depicted embodiment, the compliant conduits 120 are in the form of bellows-shaped compliant material to enable movement of the compliant conduits 120 in all of the ways depicted in FIGS. 3B to 3D.

FIG. 3B depicts axial compression of the compliant conduit 120. In the event that a compressive force is applied to the compliant conduit 120 between the proximal and distal ends 122 and 124, the compliant conduit 120 can move to the shape shown in FIG. 3B. In the depicted embodiment, the distal end 124 has been moved upward with respect to the proximal end 122. However, it will be understood that any respective movements of the proximal and distal ends 122 and 124 toward each other are possible to place the compliant conduit 120 in axial compression.

FIG. 3C depicts a laterally-displaced position of the distal end 124 of the compliant conduit 120 with respect to the proximal end 122. In the event that a lateral force is applied to the distal end 124 while the proximal end 122 is held fixed, the compliant conduit 120 can move to the shape shown in FIG. 3C. In the depicted embodiment, the distal end 124 has moved to the right with respect to the proximal end 122. However, it will be understood that any respective lateral movements of the proximal and distal ends 122 and 124 are possible to place the compliant conduit 120 into a laterally-displaced position.

FIG. 3D depicts an angularly-displaced position of the distal end 124 of the compliant conduit 120 with respect to the proximal end 122. In the event that a lateral force is applied to the distal end 124 while the proximal end 122 is held fixed or a torque is applied to the compliant conduit 120, the compliant conduit 120 can move to the shape shown in FIG. 3D. In the depicted embodiment, the distal end 124 has rotated with respect to the proximal end 122 by an angle θ. In some embodiments, the distal end 124 is capable of rotating at least 45 degrees with respect to the proximal end 122 (e.g., $\theta_{max} \geq 45°$). It will be understood that any respective angular movements of the proximal and distal ends 122 and 124 are possible to place the compliant conduit 120 into an angularly-displaced position.

Figure 4:
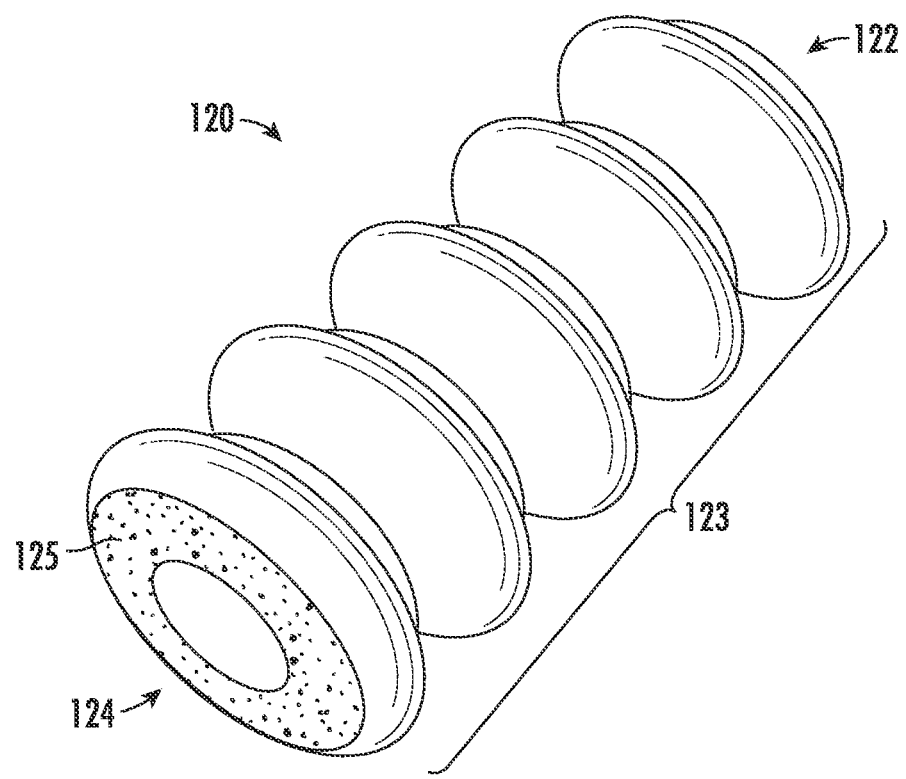
FIG. 4 depicts a perspective view of an embodiment of one of the compliant conduits from the gripping tool shown in FIGS. 1 and 2, in accordance with the embodiments disclosed herein.

FIG. 4 depicts a perspective view of an embodiment of one of the compliant conduits 120. In the depicted embodiment, the compliant conduit 120 is bellows-shaped. In some embodiments, it would be helpful for one or both of the proximal and distal ends 122 and 124 of the compliant conduit 120 to be stiffer and/or have a higher rigidity than the rest of the compliant conduit 120. Thus, it may be advantageous for the compliant conduit 120 to be a composite material with different portions of the compliant conduit 120 having a different rigidity and/or hardness. In the depicted embodiment, the compliant conduit 120 includes a lower-durometer portion 123 and a higher-durometer portion 125. The higher-durometer portion 125 is located near the distal end 124 and the lower-durometer portion 123 includes the remainder of the compliant conduit 120. In some embodiments, the higher-durometer portion 125 is more rigid than the lower-durometer portion 123. For example, in some embodiments, the higher-durometer portion 125 has a Shore durometer in a range between about 48 A and about 52 A (e.g., 50 A) and the lower-durometer portion 123 has a Shore durometer in a range between about 59 D and about 63 D (e.g., 61 D). The higher-durometer portion 125 can be beneficial for coupling the distal end 124 of the compliant conduit 120 to other components of the gripping tool. For example, the greater rigidity of the higher-durometer portion 125 may make it easier to couple the higher-durometer portion 125 to the vacuum manifold 110 or a flexible membrane of the gripping tool 100 (as discussed below). In another example, the rigidity of the higher-durometer portion 125 may make the connection between the higher-durometer portion 125 and a more compliant material (e.g., a suction cup) less susceptible to air leakage. In some embodiments, it may be advantageous to maximize the length of the lower-durometer portion 123 so that the compliant conduit is capable of moving (e.g., bending, flexing, compressing) as much as possible.

In some embodiments where the compliant conduits 120 are composite materials, the compliant conduits 120 can be cast using liquid rubbers that cure in a mold. Each material that makes up the compliant conduits 120 can be added to the mold at particular times to achieve the composite material of the compliant conduits 120. In some embodiments, the timing of casting the different materials is selected so that each material has sufficient time to cure to occupy the intended region of the mold but still remains sufficiently reactive to allow for a molecular-level interface to be formed between the two types of materials. For example, the material of the higher-durometer portion 125 can be added to a mold and allowed to cure for a sufficient time that the material occupies the portion of the mold corresponding to the distal end 124 and the material of the lower-durometer portion 123 can be added to the mold while the material of the higher-durometer portion 125 is still sufficiently reactive to allow for a molecular-level interface to be formed between the materials of the lower-durometer portion 123 and the higher-durometer portion 125. In some embodiments, it may be advantageous for all types of materials in the compliant conduits 120 to be chemically compatible. For example, the materials of the lower-durometer portion 123 and the higher-durometer portion 125 can both be urethane materials, the materials of the lower-durometer portion 123 and the higher-durometer portion 125 can both be platinum-cured silicone materials, and so forth. It will be understood that, while the example here are described with respect to two materials, any number of materials can be included in a composite material.

Referring back to FIGS. 1 and 2, the gripping tool 100 further includes check valves 128. In the depicted embodiment, one of the check valves 128 is located between the vacuum manifold 110 and one of the interior spaces 126 of the compliant conduits 120. Further in the depicted embodiment, each of the check valves 128 is coupled to one of the proximal ends 122 of the compliant conduits 120. The gripping tool 100 further includes suction cups 130. In the depicted embodiment, each of the suction cups 130 is coupled to one of the distal ends 124 of the compliant conduits 120. Each set of one of the compliant conduits 120, the respective one of the check valves 128, and the respective one of the suction cups 130 defines a vacuum channel 132. In some embodiments, the gripping tool 100 includes a number of vacuum channels 132. In the depicted embodiment, the gripping tool 100 includes a six-by-eight array of the vacuum channels 132.

Figure 5A:
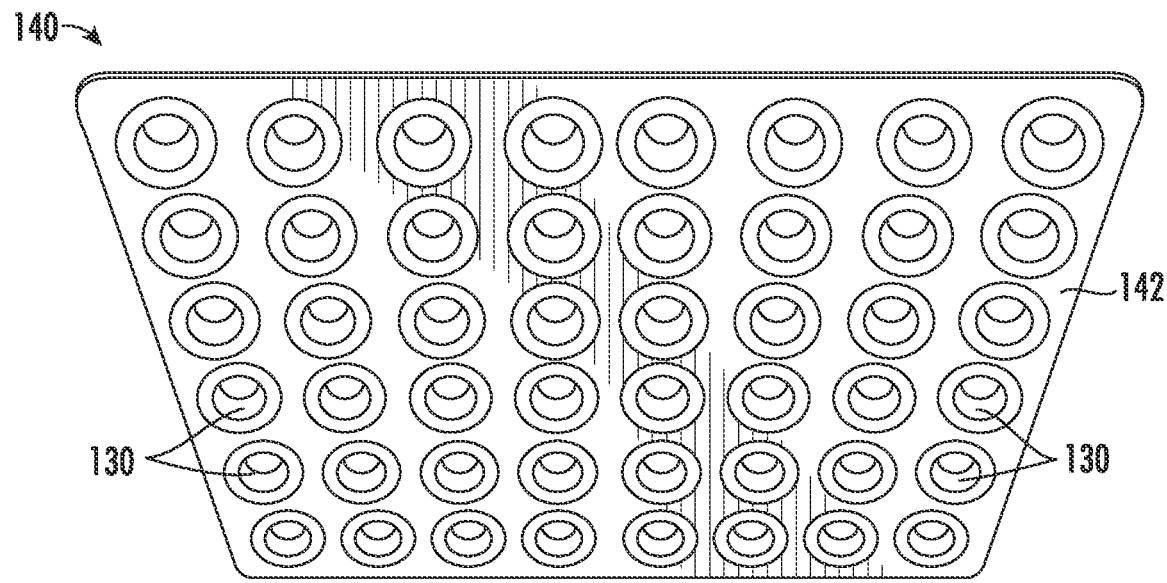
FIGS. 5A and 5B depict an object contact surface and a conduit contact surface, respectively, of the flexible membrane 140 includes, which are depicted in, respectively, in accordance with the embodiments disclosed herein.
Figure 5B:
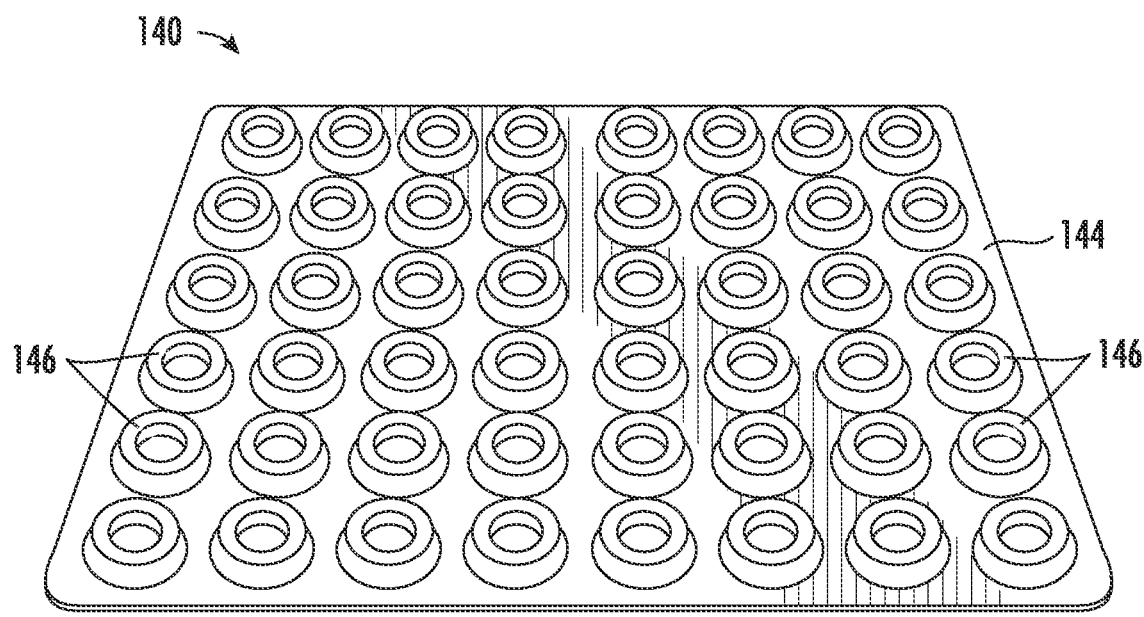

The gripping tool 100 further includes a flexible membrane 140. The flexible membrane 140 is conformable to a non-planar surface of an object. Examples of the benefits of the conformability of the flexible membrane 140 to a non-planar surface of an object are discussed in greater detail below. In some embodiments, a rigidity of the flexible membrane 140 is below the lowest rigidity of the compliant conduits 120. For example, the flexible membrane 140 can have a Shore durometer less than or equal to about 50 A. In the depicted embodiment, the flexible membrane 140 includes an object contact surface 142 and a conduit contact surface 144, which are depicted in FIGS. 5A and 5B, respectively. The object contact surface 142 is configured to be oriented in the direction of an object gripped by the gripping tool 100 and the conduit contact surface 144 is configured to be oriented in the direction of the compliant conduits 120.

In some embodiments, including the depicted embodiment, the flexible membrane 140 is configured to maintain each of the suction cups 130 substantially normal to the portion of the flexible membrane 140 at which each of the suction cups 130 is coupled. In the depicted embodiment, the suction cups 130 are integrally formed with the flexible membrane 140 and the suction cups are located on the object contact surface 142 (e.g., the distal ends of the suction cups 130 are coplanar with the object contact surface 142 of the flexible membrane 140). In this case, the flexible membrane 140 can flex (e.g., bend, curl, etc.) while each of the suction cups 130 remains substantially normal to the portion of the flexible membrane 140 immediately around each of the suction cups 130. In other embodiments, the suction cups 130 can be formed separately from the flexible membrane 140. In these embodiments, the suction cups 130 can be coupled to the flexible membrane 140 such that each of the suction cups 130 remains substantially normal to the portion of the flexible membrane 140 immediately around each of the suction cups 130 when the flexible membrane 140 flexes. The flexible membrane 140 also serves to substantially maintain respective spacing of the distal ends 124 of the compliant conduits 120 even when the flexible membrane flexes (e.g., the suctions cups 130 are indirectly coupled to each other via the flexible membrane 140).

In each of the vacuum channels 132, the suction cup 130 is coupled to the compliant conduit 120 such that the suction cup 130 is in fluid communication with the interior space 126 of the compliant conduit 120. In some embodiments, the suction cups 130 include conduit interfaces 146 that are configured to be coupled to the distal ends 124 of the compliant conduits 120. In the depicted embodiment, each of the suction cups 130 includes a cup on the object contact surface 142 of the flexible membrane 140 and the conduit interface 146 on the conduit contact surface 144 of the flexible membrane 140. In embodiments, where the distal ends 124 of the compliant conduits 120 includes the higher-durometer portion 125, the greater rigidity of the higher-durometer portion 125 may provide a better engagement (e.g., allow for a better seal) of the distal ends 124 of the compliant conduits 120 to the conduit interfaces 146 than if the distal ends 124 had a lower rigidity. In the depicted embodiment, the gripping tool further includes internal retainers 148 located in the suction cups 130 where the compliant conduits 120 engage the conduit interfaces 146.

The internal retainers 148 are configured to deter the disengagement of the compliant conduits 120 from the conduit interfaces 146. In some embodiments, the internal retainers 148 are capable of deterring disengagement of the compliant conduits 120 from the conduit interfaces 146 regardless of the rigidity of the distal ends 124 of the compliant conduits 120.

Figure 6B:
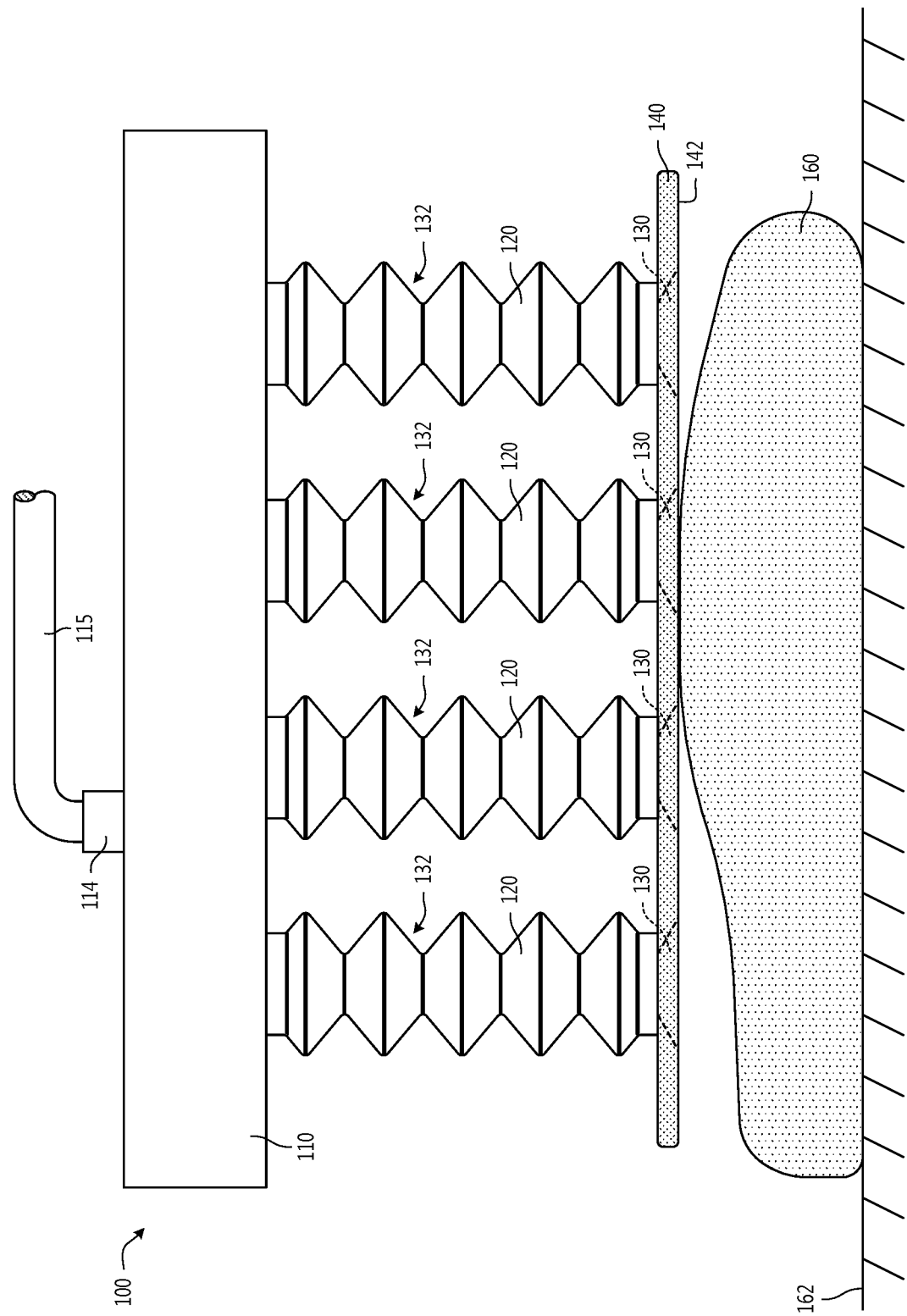

The gripping tool 100 is capable of gripping an object. In particular, the gripping tool 100 is capable of gripping a surface of an object using a vacuum regardless of whether the surface of the object is non-planar. Depicted in FIGS. 6A to 6D are a series of instances of an embodiment of a method of using the gripping tool 100 to grip and object 160 and lift the object 160 from a surface 162. In FIG. 6A, the gripping tool is positioned above the object 160. The top surface of the object 160 is non-planar. The vacuum port 114 is coupled to a vacuum source (not pictured) via a gas line 115. The compliant conduits 120 are in a resting state.

In FIG. 6B, the gripping tool 100 has been brought down so that the object contact surface 142 of the flexible membrane 140 is in contact with the top surface of the object 160. Of the suction cups 130 shown in FIG. 6B, none of the suction cups 130 has fully engaged with the top surface of the object. The vacuum check valves 128 are biased to a closed condition so that the check valves tend to eliminate or minimize the leakage of gas (e.g., air) into the interior space 112 of the vacuum manifold 110 while the vacuum is drawn by the vacuum source. Each of the vacuum check valves 128 is configured to toggle from the closed condition to an open condition when the vacuum source applies the vacuum in the vacuum manifold 110 and the corresponding suction cup 130 is engaged by the object 160. However, because the none of the suction cups 130 is engaged with the object 160, none of the vacuum check valves 128 has toggled to the open condition.

Figure 6C:
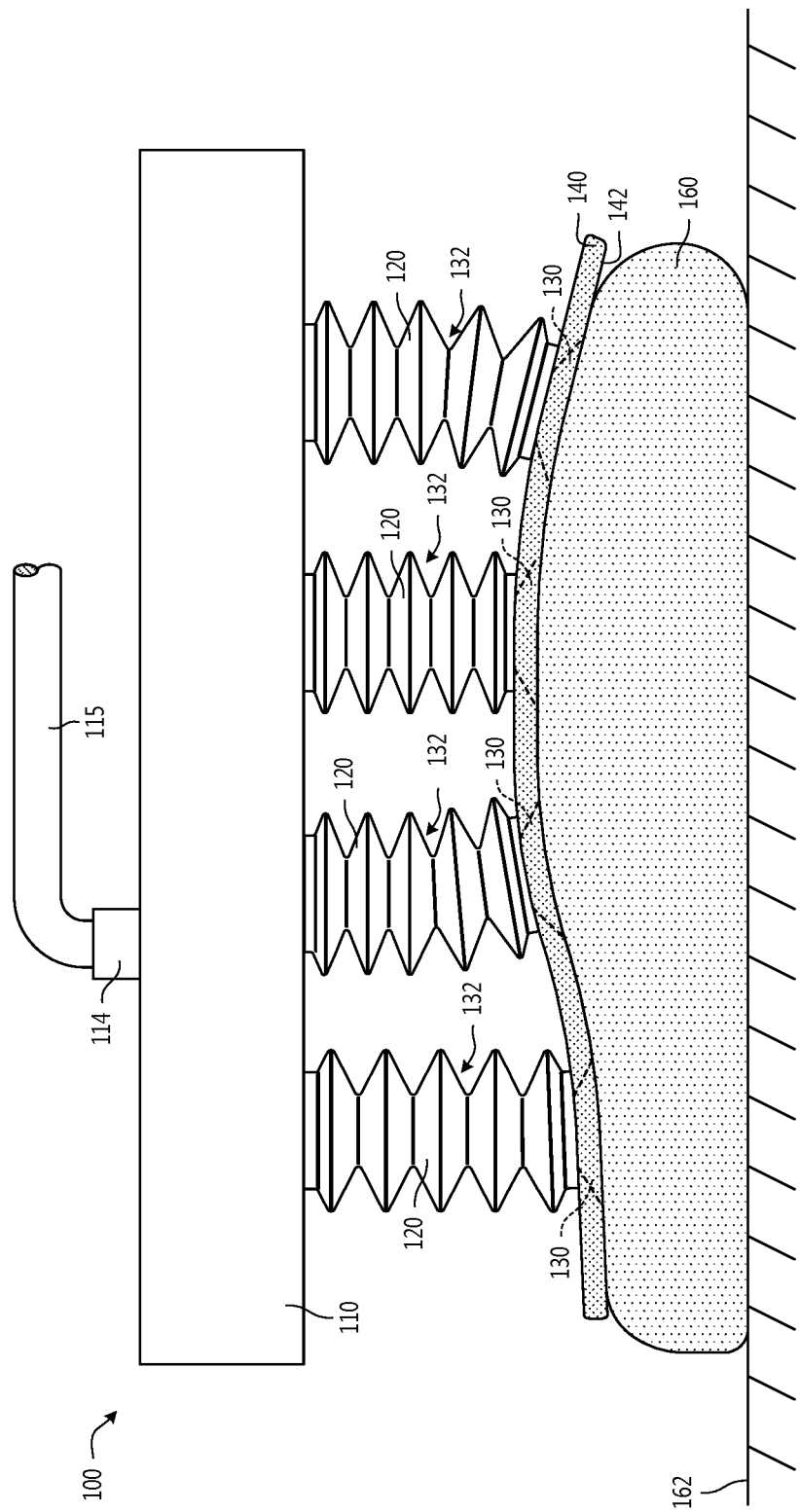

In FIG. 6C, the gripping tool has been moved further downward toward the object 160 until at least some of the compliant conduits 120 have undergone some amount of axial compression and the flexible membrane 140 has flexed along the top surface of the object 160. In the depicted embodiment, all of the depicted compliant conduits 120 have undergone some amount of axial compression and some of the depicted compliant conduits 120 have undergone angular displacement. Each of the depicted suction cups 130 has remained substantially normal to the flexible membrane 140 even after the flexible membrane 140 has flexed. In addition, all of the depicted suction cups 130 has engaged the surface of the object 160.

The flexible membrane 140 can flex around the surface of the object, such as in the case when the surface of the object is non-planar, so that some of the suction cups 130 engage the surface of the object. In some cases, at least some of the compliant conduits 120 are axially compressed so that more of the flexible membrane 140 can flex around the surface of the object and more of the suction cups 130 engage the surface of the object 160. In some embodiments, once one of the suction cups 130 engages the surface of the object 160 and a vacuum is applied in the vacuum manifold 110, gas inherently leaks across the corresponding one of the check valves 128 to equalize the pressure in the vacuum manifold 110 and the corresponding one of the compliant conduits 120. As the pressure equalizes on either side of the check valve 128, the check valve 128 toggles from the closed condition to the open condition so that the pressure is applied within that compliant conduit 120. With this arrangement, the vacuum is drawn only in those compliant conduits 120 corresponding to the suction cups that have engaged the object 160. In those compliant conduits 120, a suction force can be applied to the object 160 at the corresponding suction cup 130. In some embodiments, the vacuum in those compliant conduits 120 is a substantially-constant vacuum level that is maintained in the vacuum manifold 110 regardless of the number of the vacuum channels 132 that have unengaged suction cups 130.

It is noted that, for those compliant conduits 120 in which the vacuum is applied, the compliant conduit 120 needs to have sufficient structural stability so that the compliant conduit 120 does not collapse under the force of the vacuum. In addition, it is advantageous for the compliant conduit 120 to be able to compress axially even when the vacuum is applied inside of the compliant conduit 120. The bellows shape in the depicted embodiment may be advantageous because that shape is able to provide both radial stiffness and axial compressibility. In some embodiments, the rigidity of one or more portions of the compliant conduits 120 is selected based on an expected force of a vacuum to be applied inside of the compliant conduits 120.

In some embodiments, it may be advantageous to move the gripping tool 100 toward the object 160 until at least one of the compliant conduits 120 is axially compressed as much as possible. Doing so will allow as many of the suction cups 130 as possible to engage with the surface of the object 160. Having more suction cups 130 engaged to the surface of the object 160 increases the force of the vacuum on the object 160, increases the stability of the grip of the gripping tool 100 on the object 160, and improves the reliability of the grip of the gripping tool 100 on the object 160.

Some objects may have surfaces that do not lend themselves to allowing the suction cups 130 to fully engage to a surface of the object. For example, with an object that is a vacuum-packaged product (e.g., a vacuum-packaged piece of raw meat), the surface of the vacuum packaging material is likely to have abnormalities, such as folds and creases, on the surface. Such abnormalities can prevent some of the suction cups 130 from fully engaging with the surface of the object. If enough of the suction cups 130 are unable to fully engage with the surface of the object, then the gripping tool 100 may not be able to grip the object sufficiently or may not be able to reliably grip the object.

In some embodiments, some of the issues with surface abnormalities can be addressed by a deformable material 150 located on the object contact surface 142 of the flexible membrane 140. The deformable material 150 is configured to compress when contacting the surface of an object. In particular, the deformable material 150 is configured to compress at abnormalities in the surface of the object—such as folds and creases on the outer packaging layer of the object—and conform around the abnormalities so that the suction cups 130 are still able to engage the surface of the object. In this way, the deformable material 150 can minimize or prevent vacuum loss at abnormalities in the surface of the object, thereby improving the performance and versatility of the gripping tool 100. In some embodiments, the deformable material 150 is a foam material or an elastomeric material.

The deformable material 150 can take a variety of forms. In the embodiment depicted in FIGS. 1 and 2, the deformable material 150 is a sheet of deformable material that has been coupled to the object contact surface 142. The sheet of deformable material has holes therein that are aligned with some or all of the suction cups 130. In particular, in the embodiment depicted in FIGS. 1 and 2, the sheet of deformable material covers substantially all of the object contact surface 142 of the flexible membrane 140 with the exception of the suction cups 130. In some embodiments, the sheet of deformable material is adhered to the object contact surface 142. In some embodiments, the sheet of deformable material can be integrally formed with the object contact surface 142 as a single unit.

Figure 7:
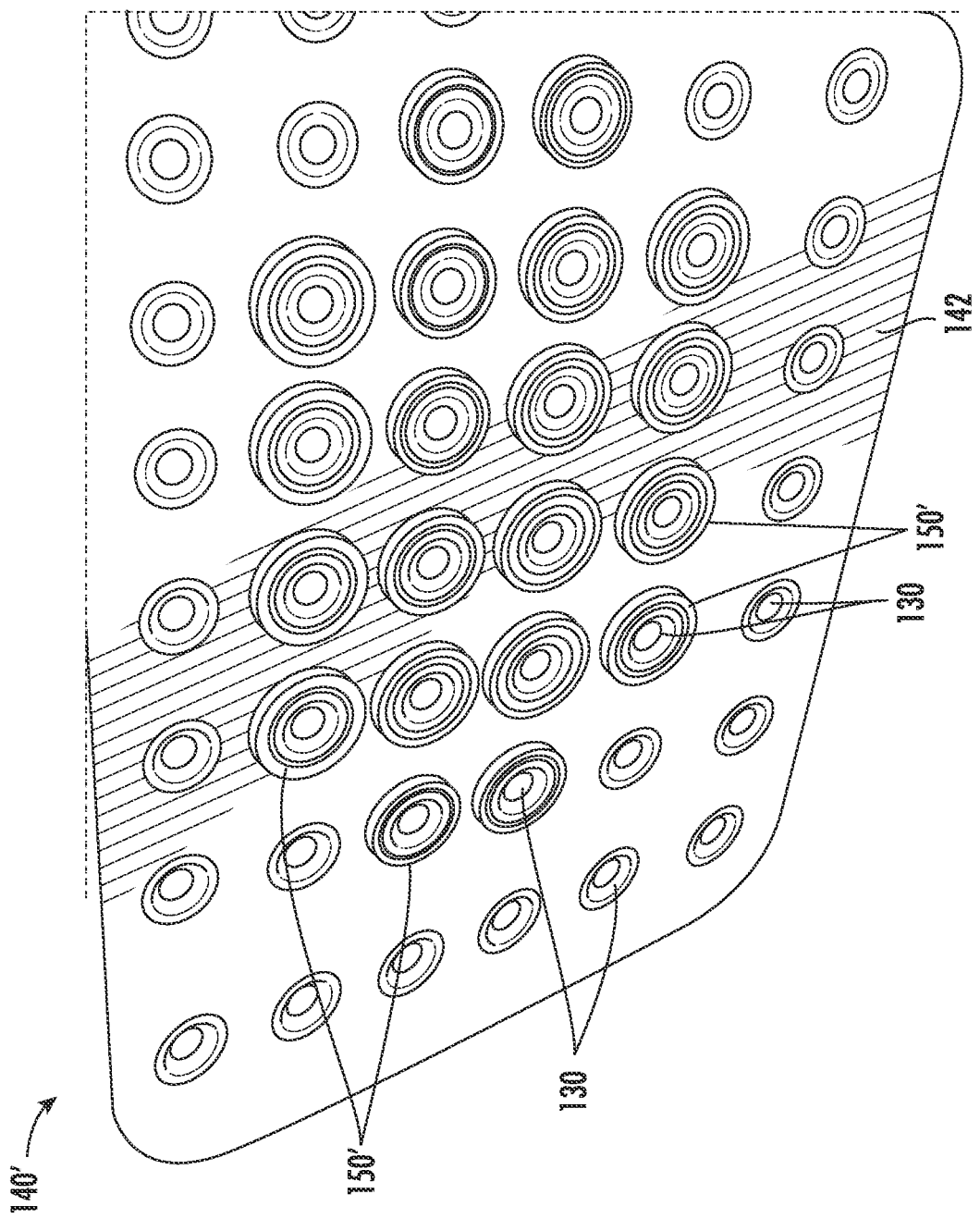
FIG. 7 depicts an embodiment of a flexible membrane that is different from the embodiment of the flexible membrane in the gripping tool shown in FIGS. 1 and 2, in accordance with the embodiments disclosed herein.

Depicted in FIG. 7 is another embodiment of a flexible membrane 140'. The flexible membrane 140' is similar to the flexible membrane 140, except that the flexible membrane 140' does not have the deformable material 150 and instead has a deformable material 150'. In the embodiment depicted in FIG. 7, the deformable material 150' is in the form of deformable rings located around some of the suction cups 130 and coupled to the object contact surface 142 of the flexible membrane 140. While the deformable rings do not cover substantially all of the object contact surface 142, the deformable rings can serve the same purpose of increasing the likelihood that each of the suctions cups 130 having a deformable ring around it will engage the surface of an object. In the depicted embodiment, the deformable rings are not placed around each of the suction cups 130, but the deformable rings are placed around the suction cups 130 that are located toward the center of the flexible membrane 140. In some embodiments, it may be advantageous for the suction cups 130 on the perimeter of the flexible membrane 140 to not have deformable material around them so that the portions of the flexible membrane 140 near the suction cups 130 on the perimeter are more flexible to engage the sides of an object. In some embodiments, the surface of the flexible membrane 140 can be tunable to different contact surfaces and/or different object compliance through specification appliques in different regions of the flexible membrane 140.

Figure 8:
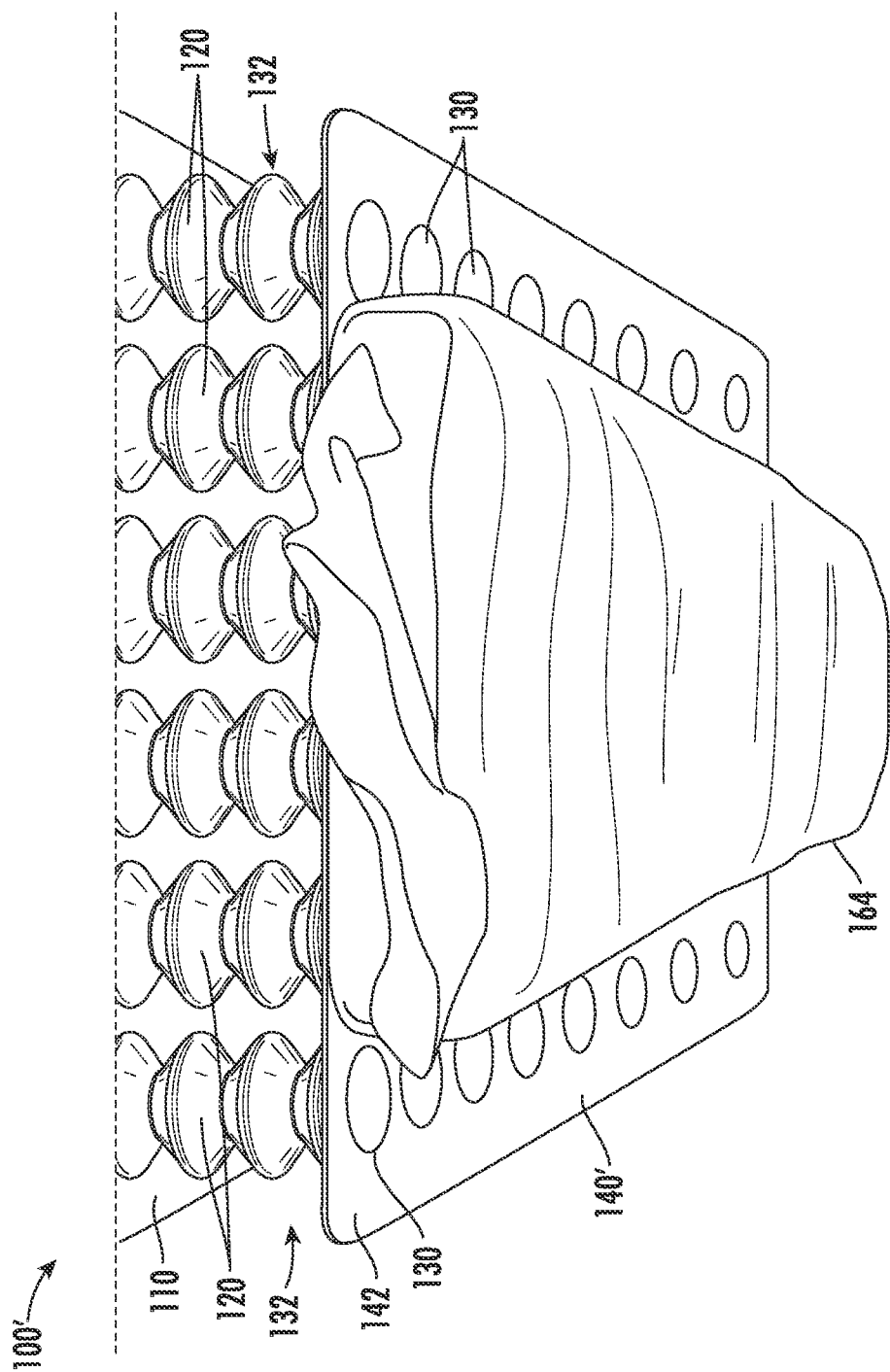
FIG. 8 depicts another embodiment of a gripping tool that includes the flexible membrane shown in FIG. 7, in accordance with the embodiments disclosed herein.

Depicted in FIG. 8 is another embodiment of a gripping tool 100'. The gripping tool 100' is similar to the gripping tool 100, except that the gripping tool 100' does not have the flexible membrane 140 and instead has the flexible membrane 140'. In the embodiment depicted in FIG. 8, the gripping tool is gripping an object 164. In the depicted embodiment, the object 164 is a vacuum-packaged product (e.g., a vacuum-packaged piece of raw meat). In the depicted embodiment, all of the suction cups 130 with the foam rings of the deformable material 150' around them have engaged the top of the object 164. When a vacuum is applied in the vacuum manifold 110, the check valves 128 of the in the vacuum channels 132 that have engaged suction cups 130 toggle to an open condition such that the vacuum is applied in those vacuum channels 132. A suction force is applied to the object 164 by those suction cups 130 that are engaged to the object 164. The suction force applied by each of those objects causes the object 164 to be gripped by the griping tool 100' and to be lifted by the gripping tool 100', as is shown in FIG. 8.

In the embodiments of gripping tools described above, the suction cups are integrally formed with the flexible membrane and the compliant conduits are coupled to the flexible membranes. The flexible membrane, the compliant conduits, and the suction cups can also be formed in other ways. In some embodiments of gripping tools, the flexible membrane, the compliant conduits, and the suction cups can all be formed as separate components that are coupled together. For example, the each of the compliant conduits can be coupled (e.g., mechanically coupled or adhesively coupled) to one of the suction cups and the suction cups can be coupled (e.g., mechanically coupled or adhesively coupled) to the flexible membrane. In some embodiments of gripping tools, the flexible membrane, the compliant conduits, and the suction cups can all be formed together integrally as a single component. In some embodiments of gripping tools, the compliant conduit and the suction cup in each of the vacuum channels can be formed as a single component and the flexible membrane can be formed separately; the flexible membrane can then be coupled to each of the vacuum channels. Any other variable of single components and/or separate components is possible.

In cases where more than one of the flexible membrane, the compliant conduits, and the suction cups are formed as a single component (or a "one-piece component"), it may be desirable to form the one-piece component as a composite material so that different portions of the one-piece can have a different rigidity, hardness, stiffness, and/or any other characteristic. Forming a one-piece component as a composite material can be made in any suitable manner, including the embodiments described above for forming a compliant conduit as a composite material. In the example where the flexible membrane, the compliant conduits, and the suction cups are formed together integrally as a single component, the compliant conduits portion may include a compliant material (e.g., an elastomer) of a durometer that allows for compliance of the compliant conduit and also the ability to resist radial buckling under vacuum. Similarly, the portion of the one-piece material that includes the suction cups and/or the flexible membrane may use a relatively lower durometer material to achieve the flexibility to conform to a non-planar surface of an object. In some embodiments, the materials used for different portions of a composite material may be chemically compatible (e.g., all of the portions are urethane materials, all of the portions are platinum-cured silicone materials, etc.).

Figure 9:
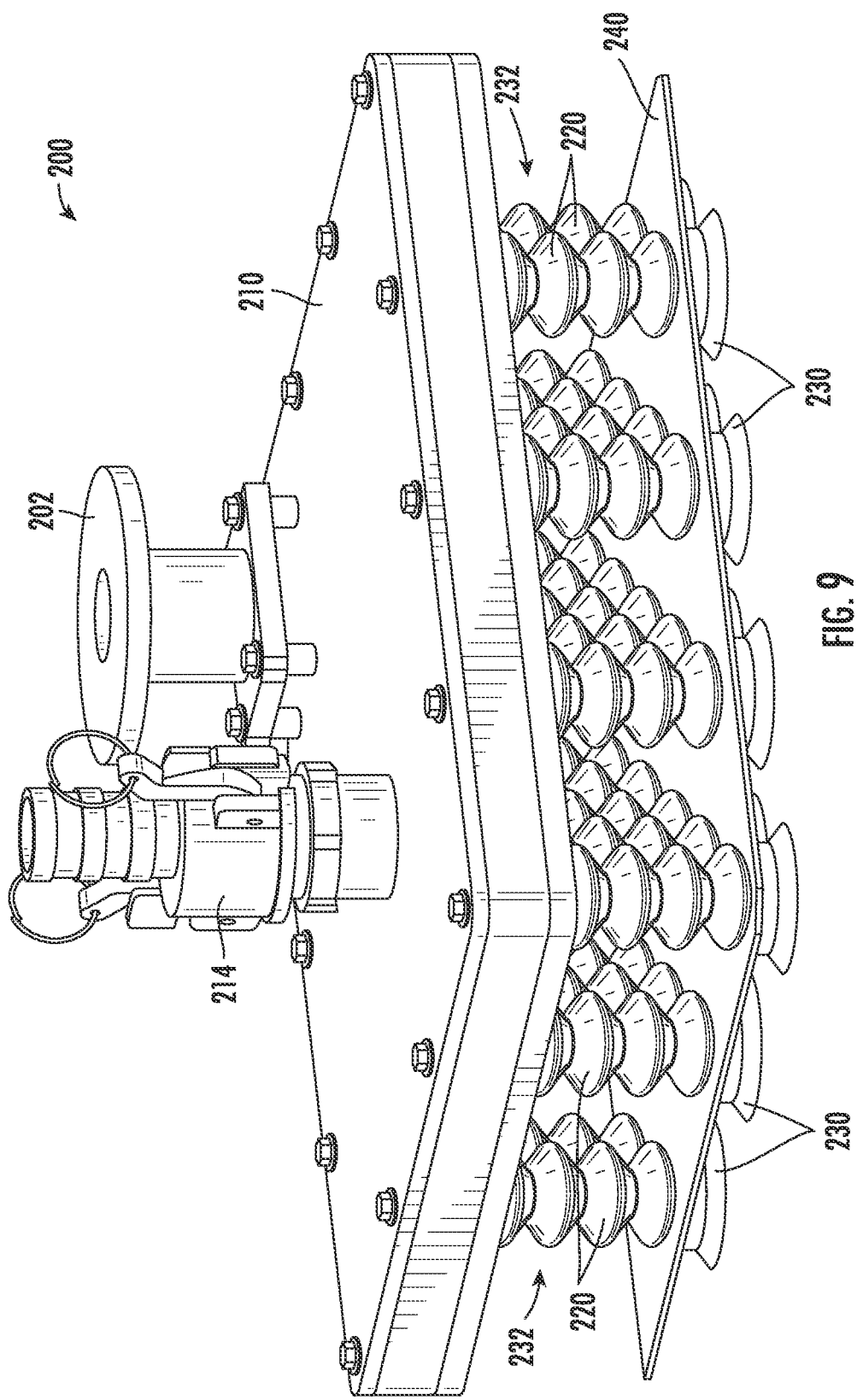
FIG. 9 depicts another embodiment of a gripping tool where the suction cups extend beyond the flexible membrane, in accordance with the embodiments disclosed herein.

Depicted in FIG. 9 is an embodiment of a gripping tool 200 where the suction cups extend beyond the flexible membrane. The gripping tool 200 includes a coupling mechanism 202 that is configured to be coupled to a movement device. The gripping tool 200 also includes a vacuum manifold 210 configured to be coupled to a vacuum source. For example, the vacuum manifold includes a vacuum port 214 that is fluidly coupled to the interior space of the vacuum manifold 210. The gripping tool 200 also includes a flexible membrane 240 that is conformable to a non-planar surface of an object.

The gripping tool 200 further includes a plurality of vacuum channels 232 coupled in parallel between the vacuum manifold 210 and the flexible membrane 240. Each of the plurality of vacuum channels 232 includes a compliant conduit 220 having a proximal end coupled to the vacuum manifold 210 and a distal end coupled to the flexible membrane 240. Each of the plurality of vacuum channels 232 further includes a vacuum check valve (not visible) coupled to the proximal end of the compliant conduit 220 (e.g., between the vacuum manifold 210 and the interior of the compliant conduit 220). Each of the plurality of vacuum channels 232 further includes a suction cup 230 coupled to the distal end of the compliant conduit 220. The vacuum check valve of each of the plurality of vacuum channels 232 is biased to a closed condition and is configured to toggle from the closed condition to an open condition when the vacuum source applies a vacuum in the vacuum manifold 210 and the suction cup is engaged by the object. Each of the check valves in the plurality of vacuum channels 232 is configured to independently toggle between the closed condition and the open condition such that, when the vacuum source applies the vacuum in the vacuum manifold 210, the vacuum is maintained in the vacuum manifold 210 and the compliant conduits 220 of the plurality of vacuum channels 232 that have engaged suction cups 230 regardless of a number of the plurality of vacuum channels 232 that have unengaged suction cups 230.

In the depicted embedment, the compliant conduits 220, the suction cups 230, and the flexible membrane 240 are all separate components. In this embodiment, the suctions cups 230 may have a cup geometry that is incompatible with the flexible membrane 240 directly contacting the object. Some conventional, discrete suction cups have lips that taper to a thin skin and ribs on the cup interior that work together to direct the location and to seal against the surface of the object. In some cases, this cup geometry is able to compensate for surface abnormalities (e.g., creases and folds in vacuum-packaged materials) without the use of a deformable material. The material thickness desired for the flexible membrane 240 to withstand deformation from flexing around an object can negatively impact the ability of the cup to seal against the object. Thus, instead of the suction cups 230 being integrated with the flexible membrane 240 and/or the lips of the suction cups 230 being coplanar with the object contact surface of the flexible membrane 240, the suction cups 230 in the depicted embodiment extend beyond the object contact surface of the flexible membrane 240. This arrangement provides separation between lips of the suction cups 230 and the object contact surface of the flexible membrane 240 so that the suction cups 230 are able to maintain gripping performance while the flexible membrane 240 maintains relative position and orientation of the suction cups 230.

In embodiments where the suction cups 230 extend beyond the object contact surface of the flexible membrane 240, the object contact surface of the flexible membrane 240 may not actually come into contact with the object when some or all of the suction cups 230 engage the object. However, the object contact surface is the surface of the flexible membrane 240 that is oriented toward the object when some or all of the suction cups 230 engage the object. This lack of direct contact of the object contact surface with the object may limit the achievable bending radius of the object contact surface in order for neighboring ones of the suction cups 230 to engage the object. However, having the suction cups 230 extended from the object contact surface provides for greater choice of the material properties for each component (e.g., the suction cups 230, the compliant conduits 220, and the flexible membrane 240). Also, having separate components allows each component to be individually removed from and/or replaced in the gripping tool 200, such as when one of the components has worn out.

Gripping tool, such as the embodiments of gripping tools described above, can be used to grip objects, move the objects, and place the objects in a desired location. In particular, a gripping tool that is capable of gripping the top of an object can place the object in spaces where a gripping tool that pinches the sides of the object cannot place the object. For example, when an object is to be placed in a box, there may not be room between the object and the sides of the box to fit the arms of a tool that grips the sides of an object. The gripping tool 100 is an example of a gripping tool that can be used to grip the upper surface of an object and place the object into a box (e.g., for shipping the object). FIGS. 10A to 10D depict instances of an embodiment of a method of the gripping tool 100 being used to load objects into a shipping container.

FIGS. 10A to 10D depict an environment 300 that includes a conveyor 362, a robotic arm 366, and a shipping container 370. In some embodiments, the conveyor 362 includes one or more of a conveyor belt, a set of rollers, a low-friction surface, a ramp, or any other mechanism configured to move objects. In the depicted embodiment, the gripping tool 100 has been coupled to the end of the robotic arm 366. In some embodiments, the robotic arm 366 can change the position, orientation, and/or operation of the gripping tool 100. For example, a computing device (e.g., a controller) can control the position of the robotic arm 366 to position the gripping tool 100, the orientation of the gripping tool 100 with respect to the end of the robotic arm 366 to orient the gripping tool 100, and/or a vacuum source coupled to the vacuum manifold 110 of the gripping tool 100 to control whether the gripping tool 100 is gripping an object. In some embodiments, the shipping container 370 is a cardboard box, a crate, a pallet, a bag, or any other container in which objects can be shipped. In the depicted embodiment, the shipping container 370 is a box that is open to receive objects.

The environment 300 also includes objects $360_1$, $360_2$, $360_3$, $360_4$, $360_5$, $360_6$, $360_7$ (collectively, objects 360). The conveyor 362 is configured to move the objects 360 in a downstream direction 364. In the depicted embodiment, the downstream direction 364 of the conveyor moves the objects 360 generally toward the shipping container 370. In the depicted embodiment, the robotic arm 366 is positioned proximate a downstream end of the conveyor 362 such that the robotic arm 366 can use the gripping tool 100 to transfer the objects 360 individually from the conveyor 362 to the shipping container 370. In some embodiments, the objects 360 are vacuum-packaged products. For example, each of the objects 360 can be a vacuum-packaged piece of raw meat (e.g., beef, chicken, turkey, fish, etc.). In some embodiments, at least some of the objects 360 have an upper surface that is a non-planar surface.

Figure 10A:
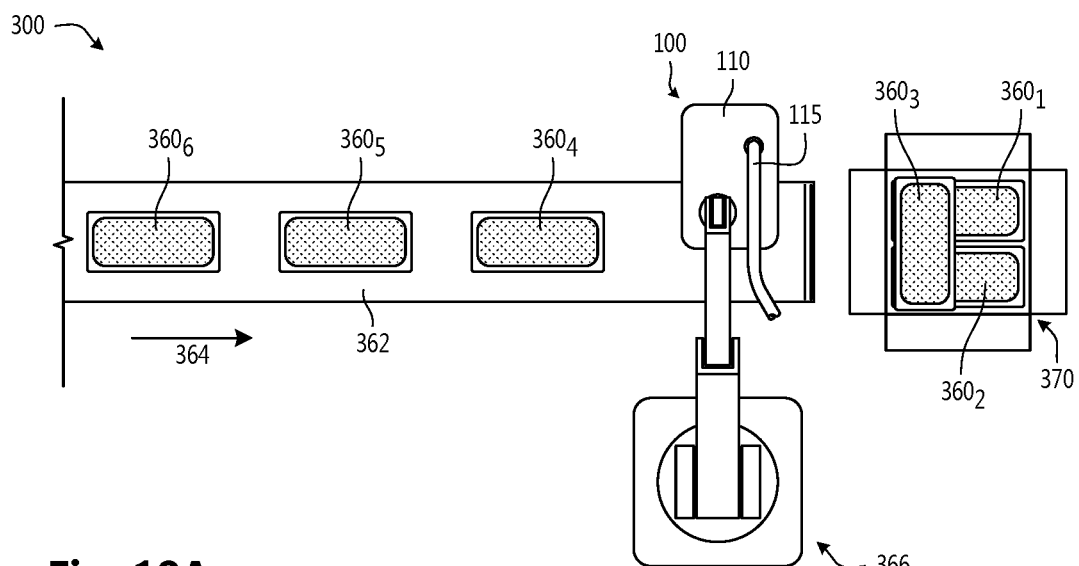
FIGS. 10A to 10D depict instances of an embodiment of a method of the gripping tool shown in FIGS. 1 and 2 being used to load objects into a shipping container, in accordance with the embodiments disclosed herein.

At the instance depicted in FIG. 10A, the objects $360_1$, $360_2$, $360_3$ are located in the shipping container 370 and the objects $360_4$, $360_5$, $360_6$ are located on the conveyor 362. In some cases, the robotic arm 366 has already transferred the objects $360_1$, $360_2$, $360_3$ from the conveyor 362 into the shipping container 370. In the depicted embodiment, the objects $360_1$, $360_2$ have been placed in the shipping container to form a first layer of the objects 360 in the shipping container 370 and the objects $360_1$, $360_2$ have a similar orientation. The object $360_3$ has also been placed in the shipping container 370 on the objects $360_1$, $360_2$ as part of a second layer of the objects 360 in the shipping container 370. In some embodiments, each layer of the objects 360 has a different orientation than the layers of the objects 360 adjacent to the layer (sometimes called a "log cabin" arrangement). In the depicted embodiment, the object $360_3$ is oriented a different direction than the orientation of the objects $360_1$, $360_2$ (e.g., substantially perpendicular to the objects $360_1$, $360_2$). Also, at the instance depicted in FIG. 10A, the gripping tool 100 has been positioned and oriented by the robotic arm 366 in a manner that is not associated with any of the objects 360. In some cases, the position and orientation of the gripping tool 100 in FIG. 10A can be an arbitrary position and orientation of the gripping tool 100 or a default position and orientation of the gripping tool 100.

Figure 10B:
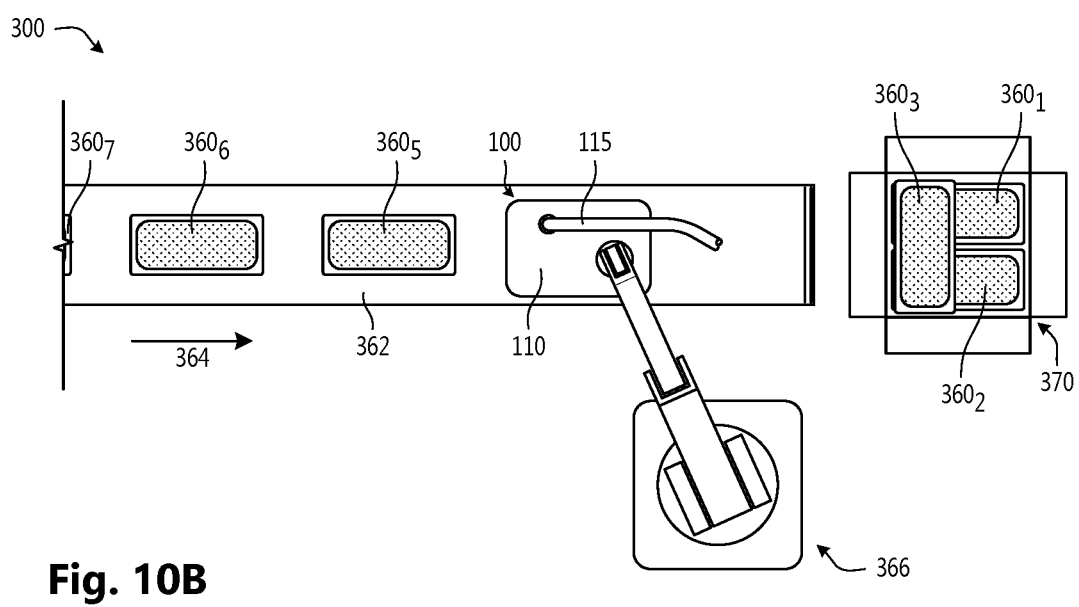

From the instance shown in FIG. 10A to the instance shown in FIG. 10B, the conveyor 362 advanced in the downstream direction 364. The advancement of the conveyor 362 caused the objects $360_4$, $360_5$, $360_6$ to move in the downstream direction and a portion of the object $360_7$ to enter the area of the environment 300 that is visible in FIG. 10B. From the instance shown in FIG. 10A to the instance shown in FIG. 10B, the robotic arm 366 moved the gripping tool 100 over the location of the object $360_4$ on the conveyor 362. The robotic arm 366 also oriented the gripping tool 100 with respect to the object $360_4$. In the depicted embodiment, the longest dimension of the gripping tool 100 is oriented substantially parallel to the longest dimension of the object $360_4$.

At the instance shown in FIG. 10B, the robotic arm 366 has positioned the gripping tool 100 with respect to the object $360_4$ such that at least some of the suction cups 130 have engaged the upper surface of the object $360_4$. In some embodiments, the upper surface of the object $360_4$ is a non-planar surface and the flexible membrane 140 is flexed when at least some of the suction cups 130 are engaged with the upper surface of the object $360_4$. At the instance depicted in FIG. 10B, a vacuum source can be activated to cause a vacuum to be drawn in the vacuum manifold 110. With some of the suction cups 130 engaged by the surface of the object $360_4$ and the vacuum source applying the vacuum in the vacuum manifold 110, the vacuum check valves 128 toggle from the closed condition to an open condition when the vacuum source applies the vacuum in the vacuum manifold 110 and the suction cups 130 are engaged by the object $360_4$. The vacuum is then applied in the compliant conduits 120 that have open vacuum check valves 128 so that the vacuum applies a force on the object $360_4$ that is greater than the weight of the object $360_4$. In this way, the object $360_4$ is gripped by the gripping tool 100. While the object $360_4$ is gripped by the gripping tool 100, the robotic arm 366 can move the object $360_4$ from the location of the object in FIG. 10B to another location. In some embodiments, a computing device (e.g., a controller) is capable of controlling both the movements and orientation of the robotic arm 366 and the operation of the vacuum source.

Figure 10C:
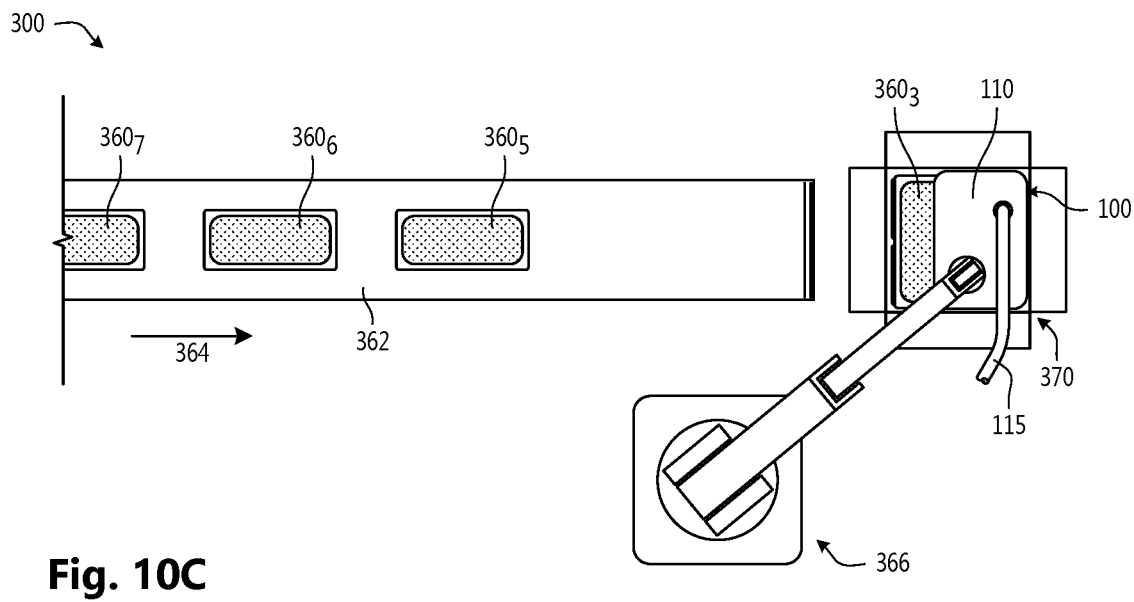
Figure 10D:
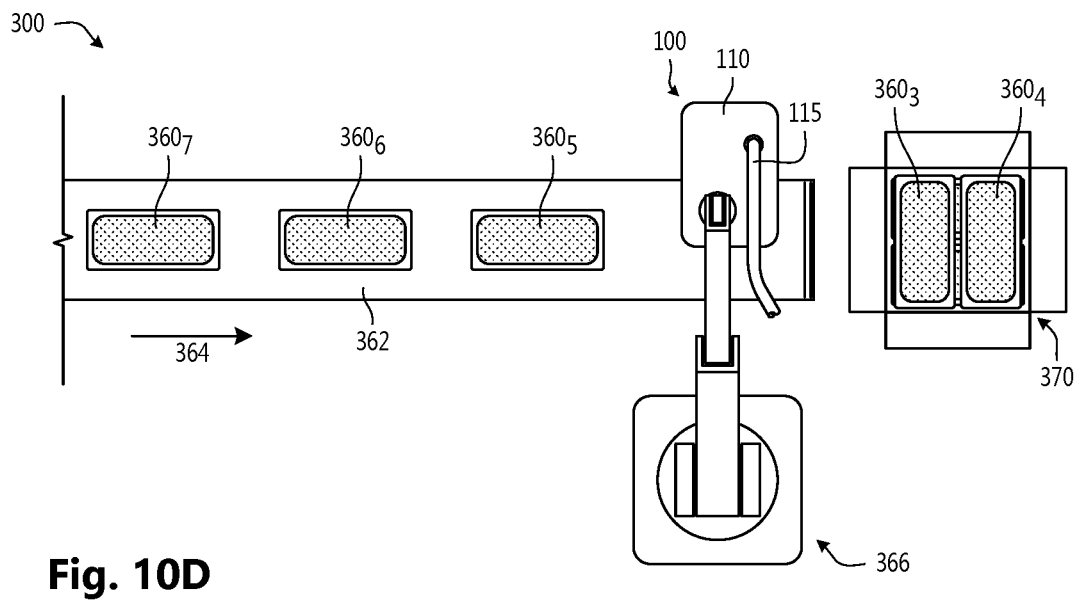

From the instance shown in FIG. 10B to the instance shown in FIG. 10C, the robotic arm 366 has moved the gripping tool 100 while the gripping tool 100 is gripping the object $360_4$ to another location. More specifically, the gripping tool 100 moved the object $360_4$ from the location on the conveyor 362 shown in FIG. 10B to a location in the shipping container 370 next to the object $360_3$. In order for the gripping tool 100 to grip the object $360_4$ between the instances shown in FIG. 10B and FIG. 10C, the vacuum source continues to apply the vacuum in the vacuum manifold 110 between the instances shown in FIG. 10B and FIG. 10C. Thus, even though the gripping tool 100 moves the object $360_4$ over an area where there is no bottom support for the object $360_4$, the vacuum in the vacuum manifold 110 and the compliant conduits 120 associated with the engaged suction cups 130 applies a force on the object $360_4$ that is greater than the weight of the object $360_4$ such that the object $360_4$ is gripped by the gripping tool 100 while the object $360_4$ is moved.

In the depicted embodiment, as the robotic arm 366 moved the object $360_4$ from the location on the conveyor 362 to the location in the shipping container 370, the robotic arm 366 changed the orientation of the object $360_4$ as the object $360_4$ was moved. In the specific embodiment depicted, the object $360_4$ was oriented substantially perpendicular to the object $360_3$ when it was on the conveyor 362 and the robotic arm 366 changed the orientation of the object $360_4$ as it was moved so that the object $360_4$ was oriented substantially parallel to the object $360_3$ when it was placed in the shipping container 370. In this way, the object $360_4$ is oriented to a desired orientation for placement in the shipping container 370. More specifically, the object $360_4$ is oriented so that the object $360_4$ completes the second layer of the objects 360 in the shipping container 370.

At the instance shown in FIG. 10C, when the object $360_4$ is at the location in the shipping container 370 next to the object $360_3$, the vacuum source can be caused to stop applying the vacuum in the vacuum manifold 110 so that the object $360_4$ is no longer gripped by the gripping tool 100. When the vacuum source is no longer applying the vacuum in the vacuum manifold 110, the vacuum check valves 128 that were in the open condition toggle back to the closed condition and the suction cups 130 no longer apply a force to the object $360_4$ so that the object $360_4$ is no longer gripped by the gripping tool 100. After the object $360_4$ is no longer gripped by the gripping tool 100, the robotic arm 366 can be moved so that the gripping tool 100 is no longer in contact with the object $360_4$. In the depicted embodiment, from the instance shown in FIG. 10C to the instance shown in FIG. 10D, the robotic arm 366 was moved so that the gripping tool 100 is no longer in contact with the object $360_4$ and the gripping tool 100 has been moved away from the object $360_4$. In the instance shown in FIG. 10D, the object $360_4$ remains in the shipping container 370 and the arbitrary or default position and orientation of the gripping tool 100 that was shown in FIG. 10A.

The embodiment of the method shown in FIGS. 10A to 10D can be repeated multiple times to continue loading the shipping container 370. For example, the conveyor 362 can continue to move the objects 360 in the downstream direction 364 and the robotic arm 366 and the gripping tool 100 can be used to individually move the objects from the conveyor 362 to the shipping container 370. The robotic arm 366 and the gripping tool 100 can also control the locations and orientations of the objects 360 in the shipping container 370 to achieve a particular arrangement of the objects 360 in the shipping container 370.

One of the benefits of the gripping tools described herein is show in FIG. 10C. Because the gripping tool 100 can grip the objects 360 from the upper surfaces of the objects 360, the gripping tool 100 can place the objects 360 in containers where other gripping tools would not be able to place the objects 360. In particular, FIG. 10C shows that the gripping tool 100 can be located over the location where the object $360_4$ was to be placed in the shipping container 370. The gripping tool 100 can particularly locate the object $360_4$ near the sides of the shipping container 370. Other types of gripping tools cannot locate objects 360 near the sides of the shipping container 370. For example, gripping tools that pinch the sides of objects would need a significant amount of space between the location where the objects are to be placed in the shipping container 370 and the sides of the shipping container 370 to accommodate the pinching mechanisms and allow the pinching mechanisms to retract away from the objects. In contrast, the gripping tool 100 can grip and release the grip on the upper surfaces of the objects without any need to access the bottom or the sides of the objects.

In some of the embodiments described herein, compliant conduits are made from a composite material. Composite materials, such compliant conduits in the form of a bellows-shaped composite material, may be advantageous to provide rigid or semi-rigid proximal and distal ends with a compliant portion therebetween. The allows the bellows-shaped compliant conduits to be coupled at the proximal and distal ends while still permitting the compliant conduits to move and bend between the proximal and distal ends. However, manufacturing bellows-shaped compliant conduits from composite materials may be expensive and/or labor-intensive. In some cases, it may be more advantageous to have compliant conduits that are made from a substantially-uniform material. FIGS. 11A and 11B depict perspective views of a partial cross-sectional view and an exploded view of another embodiment of a gripping tool 100' that includes a compliant conduit made from a substantially-uniform material.

The gripping tool 100' includes compliant conduits 120'. In some embodiments, the compliant conduits 120' are coupled to a vacuum manifold (e.g., the vacuum manifold 110). The compliant conduits 120' include proximal ends 122' and distal ends 124'. The compliant conduits 120' also include interior spaces 126'. Each of the interior spaces 126' is arranged to fluidly couple the proximal and distal ends 122' and 124' of one of the compliant conduits 120'. In some embodiments, the compliant conduits 120 are made from a compliant material, such as a rubber material like a urethane rubber, a platinum-cured silicone rubber, and the like. In some embodiments, the material of the compliant conduits 120' are selected such that the compliant conduits 120' are capable of movement and/or changes of shape without plastic deformation to the compliant conduits 120'. In some embodiments, when the proximal ends 122' of the compliant conduits 120' are fixedly coupled to a vacuum manifold, each of the distal ends 124' of the compliant conduits 120' is capable of moving in three dimensions with respect to the vacuum manifold. In some embodiments, the proximal and distal ends 122' and 124' of the compliant conduits 120' are capable of respective movement because of the compliant nature of the compliant conduits 120'.

The gripping tool 100' further includes suction cups 130'. In the embodiment depicted in FIG. 11A, each of the suction cups 130' is coupled to one of the distal ends 124' of the compliant conduits 120'. Each set of one of the compliant conduits 120', a respective check valve, and a respective one of the suction cups 130' defines a vacuum channel 132'. In some embodiments, the gripping tool 100' includes a number of vacuum channels 132'.

The gripping tool 100' further includes a flexible membrane 140'. The flexible membrane 140' is conformable to a non-planar surface of an object. Examples of the benefits of the conformability of the flexible membrane 140' to a non-planar surface of an object are discussed above with respect to the flexible membrane 140. In some embodiments, a rigidity of the flexible membrane 140' is below the lowest rigidity of the compliant conduits 120'. For example, the flexible membrane 140' can have a Shore durometer less than or equal to about 50 A. In the depicted embodiment, the flexible membrane 140' includes an object contact surface 142' and a conduit contact surface 144'. The object contact surface 142' is configured to be oriented in the direction of an object gripped by the gripping tool 100' and the conduit contact surface 144' is configured to be oriented in the direction of the compliant conduits 120'.

In some embodiments, including the depicted embodiment, the flexible membrane 140' is configured to maintain each of the suction cups 130' substantially normal to the portion of the flexible membrane 140' at which each of the suction cups 130' is coupled. In the depicted embodiment, the suction cups 130' are integrally formed with the flexible membrane 140' and the suction cups are located on the object contact surface 142' (e.g., the distal ends of the suction cups 130' are coplanar with the object contact surface 142' of the flexible membrane 140'). In this case, the flexible membrane 140' can flex (e.g., bend, curl, etc.) while each of the suction cups 130' remains substantially normal to the portion of the flexible membrane 140' immediately around each of the suction cups 130'. In other embodiments, the suction cups 130' can be formed separately from the flexible membrane 140'. In these embodiments, the suction cups 130' can be coupled to the flexible membrane 140' such that each of the suction cups 130' remains substantially normal to the portion of the flexible membrane 140' immediately around each of the suction cups 130' when the flexible membrane 140' flexes. The flexible membrane 140' also serves to substantially maintain respective spacing of the distal ends 124' of the compliant conduits 120' even when the flexible membrane flexes (e.g., the suctions cups 130' are indirectly coupled to each other via the flexible membrane 140').

In each of the vacuum channels 132', the suction cup 130' is coupled to the compliant conduit 120' such that the suction cup 130' is in fluid communication with the interior space 126' of the compliant conduit 120'. In some embodiments, the suction cups 130' include conduit interfaces 146' that are configured to be coupled to the distal ends 124' of the compliant conduits 120'. In the depicted embodiment, each of the suction cups 130' includes a cup on the object contact surface 142' of the flexible membrane 140' and the conduit interface 146' on the conduit contact surface 144' of the flexible membrane 140'.

In the depicted embodiment, the compliant conduits 120' are made from a substantially-uniform material. In some embodiments, the rigidity of the substantially-uniform material of the compliant conduits 120' may alone be insufficient to couple the distal ends 124' of the compliant conduits 120' to the conduit interfaces 146'. In the depicted embodiment, each of the compliant conduits 120' is coupled to one of the conduit interfaces 146' with the aid of an internal retainer 148', an intermediate retainer 170', and an external retainer 172'. The internal retainer 148' is positioned within the suction cup 130' and an interior of the conduit interface 146'. The intermediate retainer 170' is positioned around an exterior of the conduit interface 146'. In some embodiments, the internal retainer 148' and the intermediate retainer 170' are configured to exert a compressive force on the conduit interface 146'. In some embodiments, the outer surface of the intermediate retainer 170' is configured to engage the distal end 124' of the compliant conduit 120', as shown in FIG. 11A. in some embodiments, the external retainer 172' is placed around the outer surface of the distal end 124' of the compliant conduit 120' such that the intermediate retainer 170' and the external retainer 172' exert a compressive force on the distal end 124' of the compliant conduit 120'. In some embodiments, a rigidity of the intermediate retainer 170' is greater than each of a rigidity of the conduit interface 146' and a rigidity of the compliant conduit 120'. In this way, the intermediate retainer 170' provides a rigid interface between the compliant materials of the conduit interface 146' and/or the compliant conduit 120'. It will be understood that the depicted embodiment of a compliant conduit 120' and the intermediate retainer 170' could be used in place of the other compliant conduits described herein.

Figure 11:
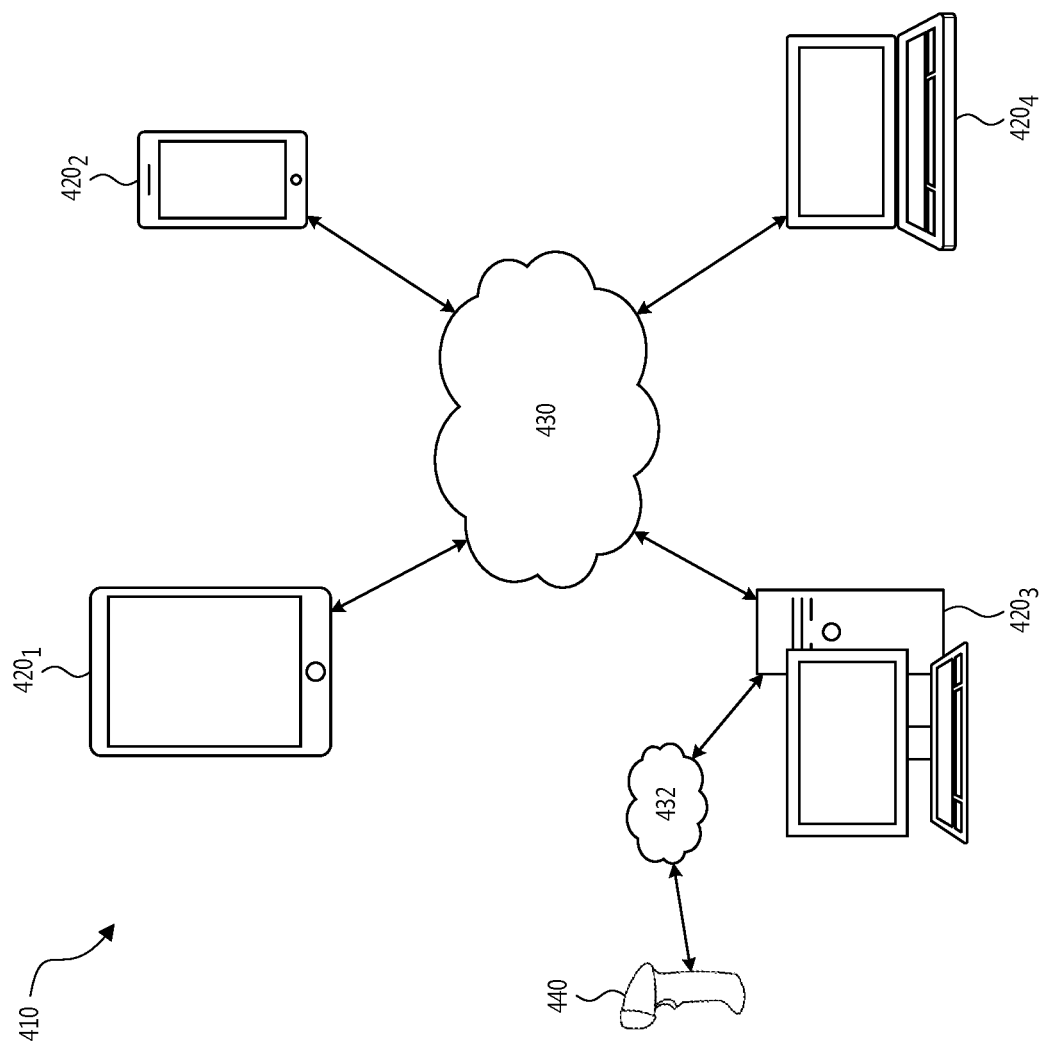
FIG. 11 depicts an example embodiment of a system that may be used to implement some or all of the embodiments described herein.
Figure 11B:
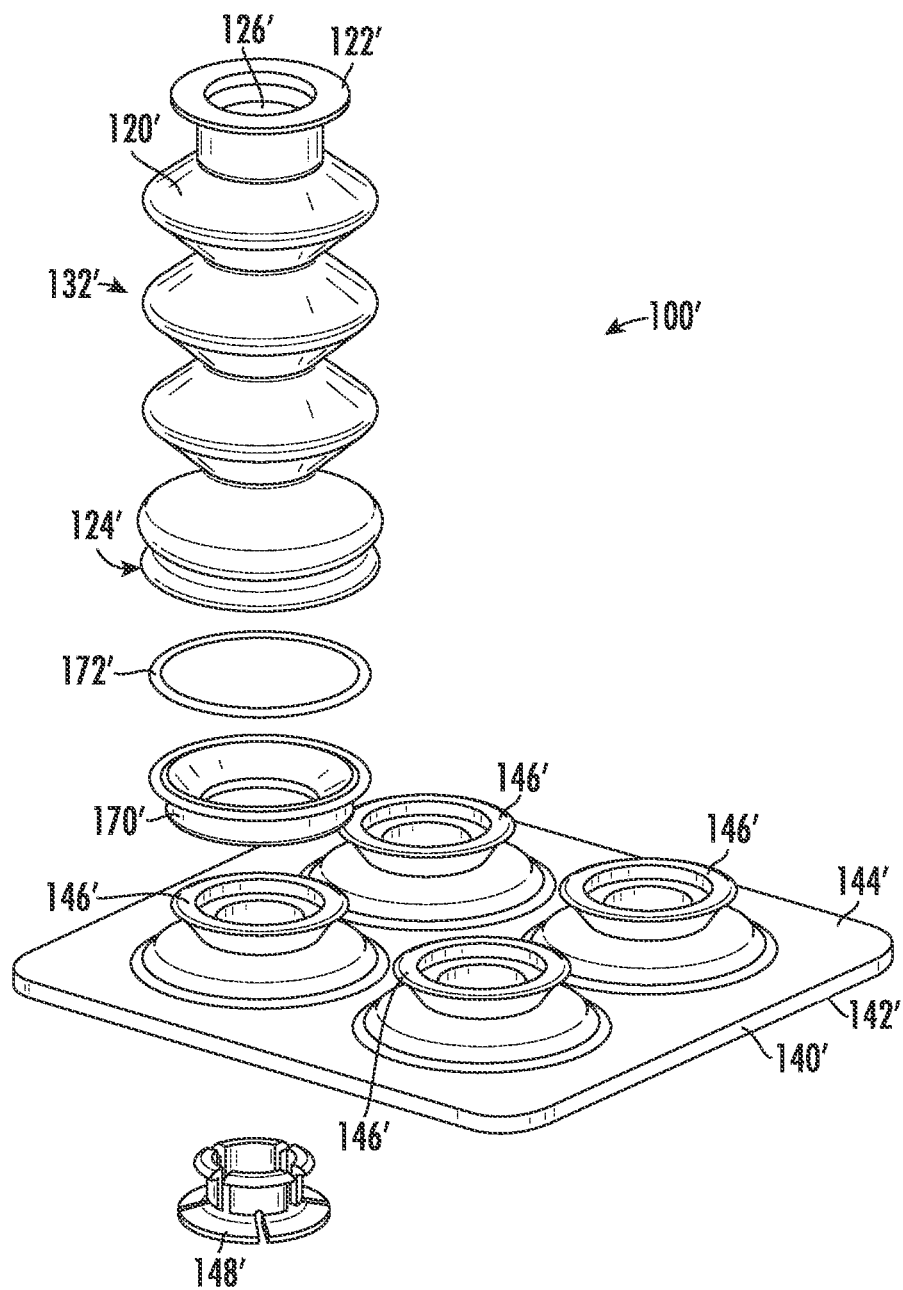

FIG. 11 depicts an example embodiment of a system 410 that may be used to implement some or all of the embodiments described herein. In the depicted embodiment, the system 410 includes computing devices 4201, 4202, 4203, and 4204 (collectively computing devices 420). In the depicted embodiment, the computing device 4201 is a tablet, the computing device 4202 is a mobile phone, the computing device 4203 is a desktop computer, and the computing device 4204 is a laptop computer. In other embodiments, the computing devices 420 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID)

tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 420 are communicatively coupled to each other via one or more networks 430 and 432. Each of the networks 430 and 432 may include one or more wired or wireless networks (e.g., a 3G network, the Internet, an internal network, a proprietary network, a secured network). The computing devices 420 are capable of communicating with each other and/or any other computing devices via one or more wired or wireless networks. While the particular system 410 in FIG. 11 depicts that the computing devices 420 communicatively coupled via the network 430 include four computing devices, any number of computing devices may be communicatively coupled via the network 430.

In the depicted embodiment, the computing device 4203 is communicatively coupled with a peripheral device 440 via the network 432. In the depicted embodiment, the peripheral device 440 is a scanner, such as a barcode scanner, an optical scanner, a computer vision device, and the like. In some embodiments, the network 432 is a wired network (e.g., a direct wired connection between the peripheral device 440 and the computing device 4203), a wireless network (e.g., a Bluetooth connection or a WiFi connection), or a combination of wired and wireless networks (e.g., a Bluetooth connection between the peripheral device 440 and a cradle of the peripheral device 440 and a wired connection between the peripheral device 440 and the computing device 4203). In some embodiments, the peripheral device 440 is itself a computing device (sometimes called a "smart" device). In other embodiments, the peripheral device 440 is not a computing device (sometimes called a "dumb" device).

Figure 12:
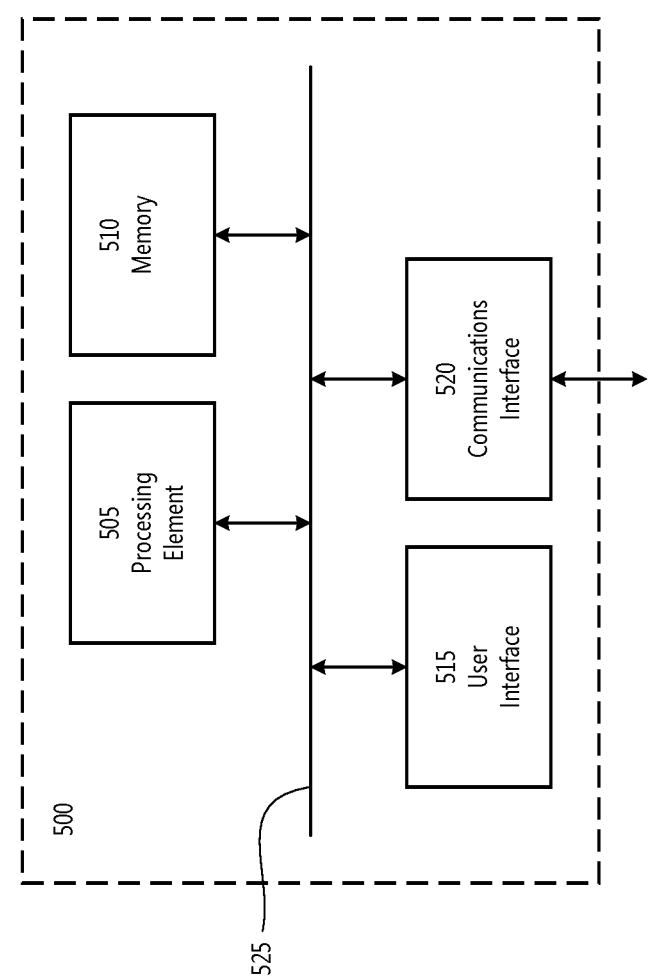
FIG. 12 depicts a block diagram of an embodiment of a computing device, in accordance with the embodiments described herein.

Depicted in FIG. 12 is a block diagram of an embodiment of a computing device 500. Any of the computing devices 420 and/or any other computing device described herein may include some or all of the components and features of the computing device 500. In some embodiments, the computing device 500 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 500 includes a processing element 505, memory 510, a user interface 515, and a communications interface 520. The processing element 505, memory 510, a user interface 515, and a communications interface 520 are capable of communicating via a communication bus 525 by reading data from and/or writing data to the communication bus 525. The computing device 500 may include other components that are capable of communicating via the communication bus 525. In other embodiments, the computing device does not include the communication bus 525 and the components of the computing device 500 are capable of communicating with each other in some other way.

The processing element 505 (also referred to as one or more processors, processing circuitry, and/or similar terms used herein) is capable of performing operations on some external data source. For example, the processing element may perform operations on data in the memory 510, data receives via the user interface 515, and/or data received via the communications interface 520. As will be understood, the processing element 505 may be embodied in a number of different ways. In some embodiments, the processing element 505 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 505 is configured for a particular use or configured to execute instructions stored in volatile or nonvolatile media or otherwise accessible to the processing element 505. As such, whether configured by hardware or computer program products, or by a combination thereof, the processing element 505 may be capable of performing steps or operations when configured accordingly.

The memory 510 in the computing device 500 is configured to store data, computer-executable instructions, and/or any other information. In some embodiments, the memory 510 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 510 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 515 of the computing device 500 is in communication with one or more input or output devices that are capable of receiving inputs into and/or outputting any outputs from the computing device 500. Embodiments of input devices include a keyboard, a mouse, a touchscreen display, a touch sensitive pad, a motion input device, movement input device, an audio input, a pointing device input, a joystick input, a keypad input, peripheral device 440, foot switch, and the like. Embodiments of output devices include an audio output device, a video output, a display device, a motion output device, a movement output device, a printing device, and the like. In some embodiments, the user interface 515 includes hardware that is configured to communicate with one or more input devices and/or output devices via wired and/or wireless connections.

The communications interface 520 is capable of communicating with various computing devices and/or networks. In some embodiments, the communications interface 520 is capable of communicating data, content, and/or any other information, that can be transmitted, received, operated on, processed, displayed, stored, and the like. Communication via the communications interface 520 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 520 may be executed using a wireless data transmission protocol, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 500 may be located remotely from other components of the computing device 500 components, such as in a distributed system. Furthermore, one or more of the components may be combined and additional components performing functions described herein may be included in the computing device 500. Thus, the computing device 500 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A gripping tool, comprising
   a vacuum manifold configured to be coupled to a vacuum source;
   a flexible membrane that is conformable to a non-planar surface of an object; and
   a plurality of vacuum channels coupled in parallel between the vacuum manifold and the flexible membrane, wherein each of the plurality of vacuum channels comprises:
      a compliant conduit having a proximal end coupled to the vacuum manifold and a distal end coupled to the flexible membrane;
      a vacuum check valve coupled to the proximal end of the compliant conduit, wherein the vacuum check valve is located between the vacuum manifold and an interior space of the compliant conduit; and
      a suction cup coupled to the distal end of the compliant conduit;
   wherein the vacuum check valve is biased to a closed condition; and
   wherein the vacuum check valve is configured to toggle from the closed condition to an open condition when the vacuum source applies a vacuum in the vacuum manifold and the suction cup is engaged by the object;
   wherein each of the check valves in the plurality of vacuum channels is configured to independently toggle between the closed condition and the open condition such that, when the vacuum source applies the vacuum in the vacuum manifold, the vacuum is maintained in the vacuum manifold and the compliant conduits of the plurality of vacuum channels that have engaged suction cups regardless of a number of the plurality of vacuum channels that have unengaged suction cups.

2. The gripping tool of claim 1, wherein each of the compliant conduits of the plurality of vacuum channels includes a bellows-shaped composite material.

3. The gripping tool of claim 2, wherein:
   the bellows-shaped composite material of each of the plurality of vacuum channels includes a first portion proximate the distal end of the compliant conduit and a second portion; and
   a rigidity of the first portion of the bellows-shaped composite material is greater than a rigidity of the second portion of the bellows-shaped composite material.

4. The gripping tool of claim 3, wherein the suction cup of each of the plurality of vacuum channels is coupled to the first portion of the bellows-shaped composite material.

5. The gripping tool of claim 1, wherein, when the proximal ends of the compliant conduits are fixedly coupled to the vacuum manifold, each of the distal ends of the compliant conduits is capable of moving in three dimensions with respect to the vacuum manifold.

6. The gripping tool of claim 5, wherein the distal end of at least one of the compliant conduits is capable of rotating at least 45 degrees with respect to the vacuum manifold.

7. The gripping tool of claim 1, wherein the suction cups of the plurality of vacuum channels are integrated with the flexible membrane.

8. The gripping tool of claim 7, wherein each of the suction cups includes a cup on an object contact surface of the flexible membrane and a conduit interface on a conduit contact surface of the flexible membrane.

9. The gripping tool of claim 8, further comprising a deformable material located on the object contact surface of the flexible membrane around at least some of the suction cups.

10. The gripping tool of claim 9, wherein the deformable material includes a plurality of foam rings coupled to the object contact surface around the at least some of the suction cups.

11. The gripping tool of claim 9, wherein the deformable material includes a sheet of foam material coupled to the object contact surface, the sheet of foam material having holes therein that are aligned with the at least some of the suction cups.

12. The gripping tool of claim 1, wherein the flexible membrane is located between the distal ends of the compliant conduits and the suction cups such that the suction cups extend away from an object contact surface of the flexible membrane.

13. The gripping tool of claim 12, wherein the suctions cups are indirectly coupled to each other via the flexible membrane.

14. The gripping tool of claim 1, wherein the compliant conduit and the suction cup of each of the plurality of vacuum channels are integrally formed together.

15. The gripping tools of claim 14, wherein the flexible membrane is coupled to the integrally-formed compliant conduit and suction cup of each of the plurality of vacuum channels.

16. The gripping tool of claim 1, wherein the flexible membrane, the compliant conduits of the plurality of vacuum channels, and the suction cups of the plurality of vacuum channels are integrally formed as a single component.

17. The gripping tool of claim 16, wherein an object contact surface of the flexible membrane is either set back from or coplanar with distal ends of the suction cups of the plurality of vacuum channels.

18. The gripping tool of claim 1, wherein the compliant conduit is made from a substantially-uniform material.

19. The gripping tool of claim 18, further comprising:
an intermediate retainer located between the distal end of the compliant conduit and a conduit interface on a conduit contact surface of the flexible membrane.

20. The gripping tool of claim 19, wherein the intermediate retainer has a rigidity greater than a rigidity of one or both of the distal end of the compliant conduit or the conduit interface.

21. The gripping tool of claim 19, further comprising:
an internal retainer positioned within an interior of the conduit interface, wherein the internal retainer and the intermediate retainer exert a compressive force on the conduit interface; and
an external retainer positioned on an exterior of the distal end of the compliant conduit, wherein the intermediate retainer and the external retainer exert a compressive force on the distal end of the compliant conduit.

22. A method of moving an object, the method comprising:
coupling the gripping tool of claim 1 to an end of a robotic arm;
moving the robotic arm until the gripping tool is in contact with an object located at a first location, wherein the gripping tool is in contact with the object such that at least one of the suction cups of the gripping tool are engaged by a surface of the object;
with the at least one of the suction cups engaged by the surface of the object, causing the vacuum source to apply the vacuum in the vacuum manifold, wherein the vacuum in the vacuum manifold and the compliant conduits associated with the at least one of the suction cups applies a force on the object that is greater than the weight of the object such that the object is gripped by the gripping tool; and
while the vacuum source applies the vacuum in the vacuum manifold so that the object is gripped by the gripping tool, moving the robotic arm so that the object moves from the first location to a second location.

23. The method of claim 22, further comprising:
after the object is at the second location, causing the vacuum source to stop applying the vacuum in the vacuum manifold so that the object is no longer gripped by the gripping tool; and
moving the robotic arm so that the gripping tool is no longer in contact with the object.

24. The method of claim 22, wherein the second location is inside of a shipping container.

25. The method of claim 24, wherein moving the robotic arm so that the object moves from the first location to the second location includes changing an orientation of the object as the object moves from the first location of the second location so that the object has a predetermined orientation inside of the shipping container.

26. The method of claim 22, wherein the surface of the object is a non-planar surface.

27. The method of claim 22, wherein the object is a vacuum-packaged product.

* * * * *